(12) United States Patent
Agarwal

(10) Patent No.: US 10,664,603 B2
(45) Date of Patent: *May 26, 2020

(54) THREAT MODELING SYSTEMS AND RELATED METHODS INCLUDING COMPENSATING CONTROLS

(71) Applicant: ThreatModeler Software Inc., Jersey City, NJ (US)

(72) Inventor: Anurag Agarwal, Jersey City, NJ (US)

(73) Assignee: ThreatModeler Software Inc., Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/270,276

(22) Filed: Feb. 7, 2019

(65) Prior Publication Data
US 2019/0205544 A1 Jul. 4, 2019

Related U.S. Application Data

(63) Continuation of application No. 15/888,021, filed on Feb. 3, 2018, now Pat. No. 10,255,439.

(Continued)

(51) Int. Cl.
*H04L 29/06* (2006.01)
*G06F 21/57* (2013.01)
(Continued)

(52) U.S. Cl.
CPC ............ *G06F 21/577* (2013.01); *G06F 16/26* (2019.01); *G06F 16/904* (2019.01);
(Continued)

(58) Field of Classification Search
CPC .................................................. G06F 21/577
See application file for complete search history.

(56) References Cited

U.S. PATENT DOCUMENTS 4,959,015 A 9/1990 Rasinski et al.
6,952,779 B1 10/2005 Cohen et al.
(Continued)

OTHER PUBLICATIONS

Roy, Maurer. "Top Database Security Threats and How to Mitigate Them." Jul. 30, 2015. Retrieved from "https://www.shrm.org/resourcesandtools/hr-topics/risk-management/pages/top-database-security-threats.aspx" (Year: 2015).*

(Continued)

*Primary Examiner* — Shawnchoy Rahman
(74) *Attorney, Agent, or Firm* — Law Office of Paul B. Johnson; Paul B. Johnson

(57) ABSTRACT

Threat modeling methods include, in response to receiving user input using computing device interfaces: storing threat model components, threats, and security requirements in a one or more database(s); associating each threat with a component; storing an indication of whether each security requirement is a compensating control; associating each compensating control with one of the threats; displaying a diagram of one of a system, an application, and a process, using visual representations of the components, the diagram defining a threat model, displaying a threat report displaying each threat associated with one of the components included in the threat model; and; displaying a report displaying each compensating control associated with one of the threats included in the threat report. Threat modeling systems include one or more computing devices coupled with one or more database(s) and having interfaces for storing, associating, displaying, and editing the components, threats, and security requirements in various ways.

20 Claims, 16 Drawing Sheets

| CHANGE STATUS LOG | | | | | |
|---|---|---|---|---|---|
| COMPENSATING CONTROL | | THREAT MODEL | | | |
| MAPPED THREATS | THREAT SOURCE | IDENTIFIED THREATS | THREAT SOURCE | ORIGINAL THREAT STATUS | MODIFIED THREAT STATUS |
| THREAT 1 | ANY SOURCE | THREAT 1 | SOURCE A | OPEN | MITIGATED |
| | | THREAT 1 | SOURCE B | OPEN | MITIGATED |
| THREAT 2 | SOURCE D | THREAT 2 | SOURCE C | OPEN | ---- |
| | | THREAT 2 | SOURCE D | OPEN | MITIGATED |
| | | THREAT 2 | SOURCE E | OPEN | ---- |
| | | THREAT 3 | SOURCE F | ---- | ---- |
| THREAT 4 | ANY SOURCE | | | | |
| THREAT 5 | SOURCE G | | | | |

1600

Related U.S. Application Data

(60) Provisional application No. 62/507,691, filed on May 17, 2017, provisional application No. 62/520,954, filed on Jun. 16, 2017, provisional application No. 62/527,671, filed on Jun. 30, 2017, provisional application No. 62/530,295, filed on Jul. 10, 2017.

(51) Int. Cl.
*G06F 16/26* (2019.01)
*G06F 16/904* (2019.01)
*G06F 3/0484* (2013.01)

(52) U.S. Cl.
CPC ...... *H04L 63/1433* (2013.01); *H04L 63/1441* (2013.01); *G06F 3/04842* (2013.01); *G06F 2221/034* (2013.01)

(56) References Cited

U.S. PATENT DOCUMENTS

| | | | |
|---|---|---|---|
| 7,096,502 | B1 | 8/2006 | Fox et al. |
| 7,260,844 | B1 | 8/2007 | Tidwell et al. |
| 7,433,829 | B2 | 10/2008 | Borgia et al. |
| 7,624,448 | B2 | 11/2009 | Coffman |
| 7,891,003 | B2 | 2/2011 | Mir |
| 7,900,259 | B2 | 3/2011 | Jeschke et al. |
| 8,191,139 | B2 | 5/2012 | Heimerdinger et al. |
| 8,255,995 | B2 | 8/2012 | Kraemer et al. |
| 8,407,801 | B2 | 3/2013 | Ikegami et al. |
| 8,413,237 | B2 | 4/2013 | O'Rourke et al. |
| 8,413,249 | B1 | 4/2013 | Chou |
| 9,043,924 | B2 | 5/2015 | Maor et al. |
| 9,497,203 | B2 | 11/2016 | Honig et al. |
| 9,774,613 | B2 | 9/2017 | Thomas et al. |
| 10,262,132 | B2 | 4/2019 | Reinecke et al. |
| 2001/0027388 | A1* | 10/2001 | Beverina ............... G06Q 20/203 703/22 |
| 2006/0015941 | A1 | 1/2006 | McKenna |
| 2006/0241991 | A1 | 10/2006 | Pudhukottai et al. |
| 2011/0126111 | A1 | 5/2011 | Gill et al. |
| 2011/0178942 | A1 | 6/2011 | Watters et al. |
| 2011/0277034 | A1 | 11/2011 | Hanson |
| 2014/0137257 | A1 | 5/2014 | Martinez et al. |
| 2014/0157417 | A1 | 6/2014 | Grubel et al. |
| 2015/0033346 | A1 | 1/2015 | Hebert et al. |
| 2016/0162690 | A1 | 6/2016 | Reith et al. |
| 2016/0248798 | A1 | 8/2016 | Cabrera et al. |
| 2017/0213037 | A1* | 7/2017 | Toledano ............... G06F 21/552 |
| 2018/0255084 | A1* | 9/2018 | Kotinas ............... H04L 63/1425 |
| 2018/0324207 | A1 | 11/2018 | Reybok, Jr. et al. |

OTHER PUBLICATIONS

A. Amini, N. Jamil, A.R. Ahmad and M.R. Z'aba, 2015. Threat Modeling Approaches for Securing Cloud Computing. Journal of Applied Sciences, 15: 953-967. Retrieved from "https://scialert.net/fulltextmobile/?doi=jas.2015.953.967" (Year: 2015).*

Threat Risk Modeling, published online at least as early as Feb. 3, 2018 by OWASP, available at https://www.owasp.org/index.php/Threat_Risk_Modeling.

Threat Model, Wikipedia, published online at least as early as Feb. 3, 2018, available at https://en.wikipedia.org/wiki/Threat_model (note that some of the material in this Wikipedia article appears to be posted by one or more inventors of the present application or its parent provisional applications—some of the material appears to be posted by Brian Beyst, for example, who is an inventor on two of the parent provisional applications).

Comparisons of Threat Model Modeling Methodologies, published online by ThreatModeler at least as early as Apr. 15, 2016, available at http://threatmodeler.com/comparison-threat-modeling-methodologies/ (note that this article appears to be affiliated with a business organization of, and may have been published under the direction of, one or more inventors of the present application or its parent provisional applications).

Microsoft Threat Modeling Tool, published online by Microsoft, different sections published at different times from Aug. 22, 2017 to Jan. 24, 2018, available online at https://docs.microsoft.com/en-us/azure/opbuildpdf/security/TOC.pdf?branch=live.

A description of an on-sale version of systems and methods, on sale in the U.S. by applicants at least as early as Dec. 31, 2011, which on-sale version disclosed some of the elements disclosed in the present application. The description includes a detailed discussion of which claim elements of the claims as originally filed in the present application were disclosed in the 2011 version and which were not, and includes screenshots of user interfaces used in the system/methods.

Lockheed Martin Corporation, "Seven Ways to Apply the Cyber Kill Chain with a Threat Intelligence Platform," published at least as early as 2015.

* cited by examiner

FIG. 6

| COMPONENTS | | |
|---|---|---|
| NAME | TYPE | LABELS |
| WIFI RTR | DEVICE | |
| MODEM | DEVICE | EMBED. SYS. |
| WIFI PORT | IOT DEVICE | IOT |
| HTTPS | PROTOCOLS | |
| COOKIES | GEN DT STORE | TMT |
| DATABASE | DB | HARDWARE |
| LOGIN | APP. COMPON. | WEB,APP,FEAT. |
| COMMENT | APP. COMPON. | WEB,APP,FEAT. |
| SHOP CART | APP. COMPON. | WEB,APP,FEAT. |
| ACH TRANS. | APP. COMPON. | WEB,APP,FEAT. |
| USB PORT | IOT DEVICE | IOT |
| FILE SVR | DEPLOY. COMP. | |
| EMAIL SVR | DEPLOY. COMP. | |
| FIREWALL | APP. COMPON. | |

Menu: HOME | KNOWLEDGE BASE | TEMPLATES | PROFILE | CHANGE PASSWORD | SIGN OUT

Toolbar: SELECT | NEW | DELETE | COPY TO LIBRARY | EDIT | SELECT LIBRARY | THREAT MODELER ▼

LOGIN
TYPE: APPLICATION COMPONENT
WEB | APPLICATION
PASSWORD
AUTHENTICATION
FEATURE
DESCRIPTION

PROPERTIES

THREATS (+)
- INDUCING ACCT LOCKOUT (X)
- SESSION HIJACKING (X)
- CLICK JACKING (X)

SECURITY REQUIREMENTS (+)
- RANDOMIZING SECRET (X)
- ENCRYPTION ALGORITHM (X)
- PARAM. DYNAMIC SQL (X)

600

THREATS

| NAME | RISK | LABELS |
|---|---|---|
| BUFFER OVERFLW | VERY HIGH | BUFFER |
| SESSION HIJACK | VERY HIGH | JAVA,CAPEC,... |
| PHYSICAL THEFT | VERY HIGH | CAPEC-507,... |
| HTTP SPLITTING | HIGH | |
| BRUTE FORCE | HIGH | CAPEC-112,... |
| DBL ENCODING | MEDIUM | CAPEC-120,... |
| SENS DATA EXP. | VERY HIGH | OWASP-A6,... |
| INTEGER ATTACKS | MEDIUM | CAPEC-128,... |
| POINTER ATTACK | MEDIUM | CAPEC-129,... |
| SYMLINK ATTACK | MEDIUM | CAPEC-132,... |
| EMAIL INJECT. | MEDIUM | CAPEC-134,... |
| FORMAT STR. INJ. | HIGH | CAPEC-135,... |
| AUTOMATION ATK. | VERY HIGH | |
| SPAM | VERY HIGH | |

SENSITIVE DATA EXPOSURE

RISK: VERY HIGH

OWASP-A6
CAPEC-610

OWASP-A5-SECURITY MIS-CONFIGURATION

DESCRIPTION
WWW.OWASP.ORG

PROPERTIES
- THREAT AGENTS +
- TEST CASES
  - TEST CASE 01 ×
  - TEST CASE 02 ×
  - TEST CASE 03 ×
- SECURITY REQUIREMENTS +
  - CLICKJACK CHEAT SHEET ×
  - TEST COMP CONTROL ×
  - SS-COMPENS. CONTROL ×

| SELECT LIBRARY | THREAT MODELER ▼ | | | |
|---|---|---|---|---|
| SECURITY REQUIREMENTS | | | NAME | |
| NAME | LABELS | | DESCRIPTION | PROPERTIES |
| | | | | CODE SNIPPETS |
| ENCRYPTION: USE ONLY STR... | AZURE LIB... | | | CODE REVIEWS |
| ENCRYPTION: ENSURE RAND... | DOM,... | | | |
| INPUT VALIDATION WITH... | HARDWARE,... | | IS COMPENSATING CONTROL ☐ | |
| TM - INPUT VALIDATION | JAVA,INI,... | | | |
| USING SSL | CERTS,... | | LABELS | |
| KEY MANAGEMENT: ENSU... | OWASP... | | | |
| TLS: PREVENT CACHING OF... | | | | |
| CERTIFICATES: USE AN APP... | CERTS,... | | | |
| ADD FIREWALL RULES | EVENT,TO,... | | | |
| HOST INTEGRITY CHECKING | TO,SSE,... | | | |
| SECURE BROWSERS | SCRIPT,LOG,... | | | |
| OUTPUT ENCODING | | | | |
| APPLY PATCHES | XSS,REL,... | | SAVE  CANCEL | |
| DISABLE HTTP TRACE | INI,HTTP,... | | | |

MITIGATIONS

DRAG A COLUMN HEADER AND DROP IT HERE TO GROUP BY THAT COLUMN

| THREAT | SOURCE | RISK | STATUS |
|---|---|---|---|
| FILE MANIPULATION | FILE SYSTEM | MEDIUM | OPEN |
| ACCESSING EXECUTABLE FILES | FILE SYSTEM | VERY HIGH | OPEN |
| CREATE FILES SAME NAME AS... | FILE SYSTEM | VERY HIGH | OPEN |
| MAN IN THE BROWSER | IE 11 | VERY HIGH | OPEN |
| MANIPULATING CONFIG FILE | FILE SYSTEM | VERY HIGH | OPEN |
| FORCE USE OF CORRUPT FILE | FILE SYSTEM | VERY HIGH | OPEN |
| MANIPULATING INPUT TO CALL | FILE SYSTEM | HIGH | OPEN |
| FILE MANIPULATION | FILE SYSTEM | MEDIUM | OPEN |
| ACCOUNT FOOTPRINTING | IE 11 | VERY HIGH | OPEN |
| AUTOMATION ATTACK | IE 11 | VERY HIGH | OPEN |
| PHYSICAL THEFT | LAPTOP | VERY HIGH | OPEN |
| PHYSICAL THEFT | LAPTOP | VERY HIGH | OPEN |
| BLUEJACKING | BLUETOOTH PORT | VERY HIGH | OPEN |
| PHISHING | OUTLOOK 2010 | VERY HIGH | OPEN |
| SPAM | OUTLOOK 2010 | VERY HIGH | OPEN |
| DNS CACHE POISONING | EMAIL SERVER | VERY HIGH | OPEN |

[MITIGATE] [CLOSE]

COMPENSATING CONTROLS

DRAG A COLUMN HEADER AND DROP IT HERE TO GROUP BY THAT COLUMN

| CONTROL | THREAT | SOURCE | RISK | STATUS |
|---|---|---|---|---|
| FIREWALL | TCP WINDOW SCAN | WINDOWS 7 | LOW | MITIGATED |
| FIREWALL | TCY SYN SCAN | TCP | LOW | OPEN |
| FIREWALL | TCP ISN CTR RATE PROBE | TCP | LOW | OPEN |
| FIREEYE | MAN IN THE BROWSER | IE 11 | VERY HIGH | MITIGATED |
| CYLANCE | MALWARE PROP VIA USB | USB PORT | VERY HIGH | MITIGATED |
| AV DLP | FORCE USE CORRUPT FILE | FILE SYSTEM | VERY HIGH | MITIGATED |
| MCAFEE DLP | MAN IN THE MIDDLE ATK | WIFI PORT | VERY HIGH | MITIGATED |
| BIT9 | FILE MANIPULATION | FILE SYSTEM | MEDIUM | MITIGATED |
| BIT9 | ACCOUNT FOOTPRINTING | IE 11 | VERY HIGH | OPEN |
| BIT9 | AUTOMATION ATTACK | IE 11 | VERY HIGH | MITIGATED |
| AV HIPS | PHYSICAL THEFT | LAPTOP | VERY HIGH | MITIGATED |
| BITLOCKER | PHYSICAL THEFT | LAPTOP | VERY HIGH | MITIGATED |
| IPC | BLUEJACKING | BLUETOOTH PORT | VERY HIGH | OPEN |
| IRONPORT | PHISHING | OUTLOOK 2010 | VERY HIGH | OPEN |
| IRONPORT | SPAM | OUTLOOK 2010 | VERY HIGH | MITIGATED |
| AKAMAI DNS | DNS CACHE POISONING | EMAIL SERVER | VERY HIGH | OPEN |

| THREAT MODELS | V. |
|---|---|
| NAME | V. |
| AIR VEHIC SYS | 1.0 |
| AWS - EC2 | 1.0 |
| BANKING APP | 1.2 |
| IOT ENVIR. | 1 |
| WRK COMMUTE | 1 |
| CRM APP | 2.0 |
| ECOMM POC | 2.5 |
| END POINT SEC. | 1 |
| IOT SERVER | 1 |
| MICROWEB SVC | 1.0 |
| MOBILE BAKE... | 1 |
| SQL DB | 12 |
| HEALTH THREAT | 1.0 |
| ONLINE BANK | 1 |
| FINAN. THREAT | 1 |

ENDPOINT SECURITY V.1

THREATS 353 | SECURITY REQTS 82 | TEST CASES 5 | CODE RVW 3

CHANGE RISK ▼ | CHANGE RISK STATUS ▼

DRAG HEADER HERE TO GROUP BY THAT COLUMN

| THREAT ▼ | RISK ▼ | STATUS ▼ | SOURCE ▼ | ACTION ▼ |
|---|---|---|---|---|
| ACCT HIJACK | VERY HIGH | OPEN | AWS ELB | D NOTE |
| INSEC. COMM. | VERY HIGH | OPEN | AWS ELB | D NOTE |
| PWD BRUTE F... | HIGH | OPEN | APP | D NOTE |
| SENS DATA EXP | VERY HIGH | OPEN | APP | D NOTE |
| SQL INJECTION | HIGH | MITIGATED | APP | D NOTE |
| BLIND SQL INJ | HIGH | MITIGATED | APP | D NOTE |
| IDENT SPOOF | MEDIUM | OPEN | WEB BR | D NOTE |
| TARGETED MAL | VERY HIGH | OPEN | WEB BR | D NOTE |
| CLICKJACKING | VERY HIGH | OPEN | APP | D NOTE |
| X SITE TRACNG | VERY HIGH | OPEN | WEB SVR | D NOTE |
| IIS SNIFFING | VERY HIGH | OPEN | WCF SVC | D NOTE |
| XML SVC DEN | VERY HIGH | OPEN | WEB SVC | D NOTE |
| BUFFER OVFLW | VERY HIGH | OPEN | MS WORD | D NOTE |
| FILE MANIP | MEDIUM | MITIGATED | FILE SYS | D NOTE |
| PHYS THEFT | VERY HIGH | MITIGATED | LAPTOP | D NOTE |
| BLUEJACKING | VERY HIGH | OPEN | BT PORT | D NOTE |

FIG. 13

| CHANGE STATUS LOG | | | | | | |
|---|---|---|---|---|---|---|
| COMPENSATING CONTROL | | | THREAT MODEL | | | |
| MAPPED THREATS | THREAT SOURCE | IDENTIFIED THREATS | THREAT SOURCE | ORIGINAL THREAT STATUS | MODIFIED THREAT STATUS | |
| THREAT 1 | ANY SOURCE | THREAT 1<br>THREAT 1 | SOURCE A<br>SOURCE B | OPEN<br>OPEN | MITIGATED<br>MITIGATED | |
| THREAT 2 | SOURCE D | THREAT 2<br>THREAT 2<br>THREAT 2 | SOURCE C<br>SOURCE D<br>SOURCE E | OPEN<br>OPEN<br>OPEN | ---<br>MITIGATED<br>--- | |
| | | THREAT 3 | SOURCE F | --- | --- | |
| THREAT 4<br>THREAT 5 | ANY SOURCE<br>SOURCE G | | | | | |

THREAT MODELING SYSTEMS AND RELATED METHODS INCLUDING COMPENSATING CONTROLS

CROSS REFERENCE TO RELATED APPLICATIONS

This document is a continuation of U.S. Nonprovisional patent application Ser. No. 15/888,021, entitled "Threat Modeling Systems and Related Methods Including Compensating Controls," naming as first inventor Anurag Agarwal, which was filed on Feb. 3, 2018, now pending, and also claims the benefit of the filing date of U.S. Provisional Patent Application Ser. No. 62/507,691, entitled "System and Method of Including Compensating Controls in a Threat Modeling Process," naming as first inventor Anurag Agarwal, which was filed on May 17, 2017, now expired, and also claims the benefit of the filing date of U.S. Provisional Patent Application Ser. No. 62/527,671, entitled "System and Method for Identifying and Analyzing the Potential Attack Surface of a Complex System," naming as first inventor Anurag Agarwal, which was filed on Jun. 30, 2017, now expired, and also claims the benefit of the filing date of U.S. Provisional Patent Application Ser. No. 62/530,295, entitled "Method and Apparatus for Early Implementation of Enterprise DevSecOps," naming as first inventor Anurag Agarwal, which was filed on Jul. 10, 2017, now expired, and also claims the benefit of the filing date of U.S. Provisional Patent Application Ser. No. 62/520,954, entitled "System and Method for Identifying Potential Threats to a Complex System," naming as first inventor Anurag Agarwal, which was filed on Jun. 16, 2017, now expired, the disclosures of each of which are hereby incorporated entirely herein by reference.

BACKGROUND

1. Technical Field

Aspects of this document relate generally to threat modeling processes and systems.

2. Background Art

Threat modeling is a process by which vulnerabilities of a system or process may be detailed and prioritized. One example of an existing threat modeler is a modeler marketed under the name THREAT MODELING TOOL by Microsoft Corporation of Redmond, Wash. Threat modeling allows a user to analyze potential attack vectors and prioritize vulnerabilities. While some threat modeling involves threats related to computing networks and systems, threat modeling in general encompasses a broader scope and may involve modeling threats in non-computer-related systems and processes. Some commercial threat modeling tools utilize a dynamic question and answer user interface which generally relies on an underlying data flow diagram (DFD) or process flow diagram (PFD) conceptual basis.

SUMMARY

Embodiments of threat modeling methods may include: in response to receiving one or more user inputs, using one or more interfaces displayed on one or more displays of one or more computing devices communicatively coupled with one or more databases: storing a plurality of threat model components in the one or more databases; storing a plurality of threats in the one or more databases; associating each threat with at least one of the threat model components through the one or more databases; storing a plurality of security requirements in the one or more databases, including storing an indication of whether each security requirement is a compensating control; associating each compensating control with at least one of the threats through the one or more databases; displaying a relational diagram of one of a system, an application, and a process, using visual representations of one or more of the threat model components, the relational diagram defining a threat model; generating and displaying a threat report displaying each threat that is associated through the one or more databases with one of the threat model components included in the threat model; and; generating and displaying a report displaying each compensating control that is associated through the one or more databases with one of the threats included in the threat report.

Embodiments of threat modeling methods may include one or more or all of the following:

The method may further include, in response to receiving the one or more user inputs, adding one of the threat model components to the relational diagram and automatically including each threat associated with the added threat model component to the threat report.

The method may further include, in response to receiving the one or more user inputs, removing one of the threat model components from the relational diagram and automatically excluding each threat associated with the removed threat model component from the threat report except for threats also associated with other threat model components included in the threat report.

The threat report may display a threat status for each threat indicating whether that threat has been mitigated.

The threat report may include one or more input fields configured to, in response to receiving one or more user inputs, manually change each threat status.

The method may further include, in response to receiving the one or more user inputs, removing one of the compensating controls from the relational diagram and automatically changing the threat status of at least one of the threats included in the threat report to an unmitigated status.

The method may further include, in response to receiving a user selection of one of the compensating controls previously included in the relational diagram, displaying a mitigations interface displaying each threat included in the threat report and identifying which of the displayed threats are mitigatable by the selected compensating control.

The method may further include, in response to receiving one or more user inputs using the mitigations interface, altering which of the displayed threats are mitigatable by the selected compensating control.

The method may further include, in response to receiving one or more user inputs using the mitigations interface, changing a threat status, of each threat mitigatable by the selected compensating control, to a mitigated status.

Embodiments of threat modeling systems may include: one or more computing devices communicatively coupled with one or more databases, the one or more computing devices displaying, on one or more displays of the one or more computing devices: one or more input interfaces configured to, in response to receiving one or more user inputs, store a plurality of user-defined threat model components in the one or more databases, store a plurality of threats in the one or more databases, associate each of the threats with at least one of the threat model components through the one or more databases, store a plurality of security requirements in the one or more databases including an indication for each security requirement indicating whether it is a compensating control, and associate each compensating control with at least one of the threats through the one or more databases; a diagram interface configured to, in response to receiving one or more user inputs, diagram one of a system, an application, and a process, using visual representations of the threat model components stored in the one or more databases, to define a threat model; a threat report interface including a threat report displaying each threat that is associated through the one or more databases with one of the threat model components included in the threat model; and; a compensating control report displaying each compensating control that is associated through the one or more databases with one of the threats included in the threat report.

Embodiments of threat modeling systems may include one or more or all of the following:

The threat report may include a table displaying, for each displayed threat, a risk level, a threat status indicating whether that threat has been mitigated, and a source.

The threat report may include one or more input fields configured to, in response to receiving one or more user inputs, manually change the threat status of a selected threat.

The compensating control report may include a table displaying, for each displayed compensating control, a mitigatable threat, a source for the mitigatable threat, a risk level for the mitigatable threat, and a threat status indicating whether the mitigatable threat has been mitigated.

The one or more displays may further display a threat tree visually depicting each threat model component included in the threat model, each threat associated with that threat model component depicted branching from that threat model component, and each compensating control associated with that threat depicted branching from that threat.

The one or more input interfaces may be further configured to, in response to receiving the one or more user inputs, associate each threat model component with one or more of the security requirements through the one or more databases.

The diagram interface may be further configured to, in response to receiving the one or more user inputs, diagram a communication protocol between two diagrammed threat model components, the diagrammed communication protocol including an alphanumeric indicator of the communication protocol.

The one or more displays may further display a mitigations interface displaying all threats included in the threat report that are associated through the one or more databases with a selected compensating control, the mitigations interface identifying which of the displayed threats are mitigatable by the selected compensating control.

The mitigations interface may include one or more input fields configured to, in response to receiving one or more user inputs, alter which of the displayed threats are mitigatable by the selected compensating control.

The mitigations interface may include one or more input fields configured to, in response to receiving one or more user inputs, change a threat status, of all threats mitigatable by the selected compensating control, to a mitigated status.

Embodiments of threat modeling systems may include: one or more computing devices communicatively coupled with one or more databases, the one or more computing devices displaying, on one or more displays of the one or more computing devices: one or more input interfaces configured to, in response to receiving one or more user inputs, store a plurality of user-defined threat model components in the one or more databases, store a plurality of threats in the one or more databases, associate each of the threats with at least one of the threat model components through the one or more databases, store a plurality of security requirements in the one or more databases including an indication for each security requirement indicating whether it is a compensating control, and associate each compensating control with at least one of the threats through the one or more databases; a diagram interface configured to, in response to receiving one or more user inputs, diagram one of a system, an application, and a process, using visual representations of the threat model components stored in the one or more databases, to define a threat model; a threat report interface including a threat report displaying each threat that is associated through the one or more databases with one of the threat model components included in the threat model; a compensating control report displaying: each compensating control that is associated through the one or more databases with one of the threats included in the threat report; the threat included in the threat report that is associated with that compensating control (mitigatable threat), and; a threat status for each mitigatable threat indicating whether it has been mitigated, and; a mitigations interface displaying all threats included in the threat report that are associated through the one or more databases with a selected compensating control, the mitigations interface identifying which of the displayed threats are mitigatable by the selected compensating control, the mitigations interface including one or more input fields configured to, in response to receiving one or more user inputs, change the threat status of all threats mitigatable by the selected compensating control to a mitigated status.

General details of the above-described embodiments, and other embodiments, are given below in the DESCRIPTION, the DRAWINGS, and the CLAIMS.

BRIEF DESCRIPTION OF THE DRAWINGS

Embodiments will be discussed hereafter using reference to the included drawings, briefly described below, wherein like designations refer to like elements:

FIG. 6 is an implementation of an interface of the system of FIG. 1;

FIG. 8 is an implementation of an interface of the system of FIG. 1;

FIG. 9 is an implementation of an interface of the system of FIG. 1;

FIG. 11 is an implementation of an interface of the system of FIG. 1;

FIG. 12 is an implementation of an interface of the system of FIG. 1;

FIG. 13 is an implementation of an interface of the system of FIG. 1;

FIG. 16 is an implementation of an interface of the system of FIG. 1.

DESCRIPTION

Implementations/embodiments disclosed herein (including those not expressly discussed in detail) are not limited to the particular components or procedures described herein. Additional or alternative components, assembly procedures, and/or methods of use consistent with the intended system and method of including compensating controls in a threat modeling process may be utilized in any implementation. This may include any materials, components, sub-components, methods, sub-methods, steps, and so forth.

As used herein, the term "input field" includes a "selector." For example, a button or space on a user interface in which a user may move a cursor to and click to make a selection, and a checkbox field, and other similar fields, as well as alphanumeric input fields, are all "input fields" as used herein.

The term "compensating control" is a term of art and is defined herein as an alternative mechanism to a security requirement or standard issued by a standards-issuing body that is allowed by the standards-issuing body when the security requirement or standard as stated cannot be met by a party due to legitimate technical or documented business constraints.

In the payment card industry (PCI), as a non-limiting example, compensating controls were introduced in Payment Card Industry Data Security Standard (PCI DSS) 1.0 to give organizations an alternative to security requirements that could not be met due to legitimate technological or business constraints. According to the PCI Council, which was the standards-issuing body issuing the standard (jointly created by the four major credit-card companies VISA, MASTERCARD, DISCOVER, and AMERICAN EXPRESS), compensatory controls in that industry must: (1) meet the intent and rigor of the original stated requirement; (2) provide a similar level of defense as the original stated requirement; (3) be "above and beyond" other PCI DSS requirements (not simply in compliance with other PCI DSS requirements); and (4) be commensurate with the additional risk imposed by not adhering to the original stated requirement. Examples of compensating controls for information technology include: using audit trails and logs for payroll management instead of segregation of duties (having two individuals responsible for separate parts of payroll management); the use of database security applications and services, network access control (NAC), data leak prevention strategies, and e-mail encryption in lieu of comprehensive encryption (i.e., in lieu of converting all electronic data into ciphertext and changing cryptographic keys periodically); two-factor authentication with a change of password every 60 days in lieu of long complex passwords; and so forth.

Figure 1:
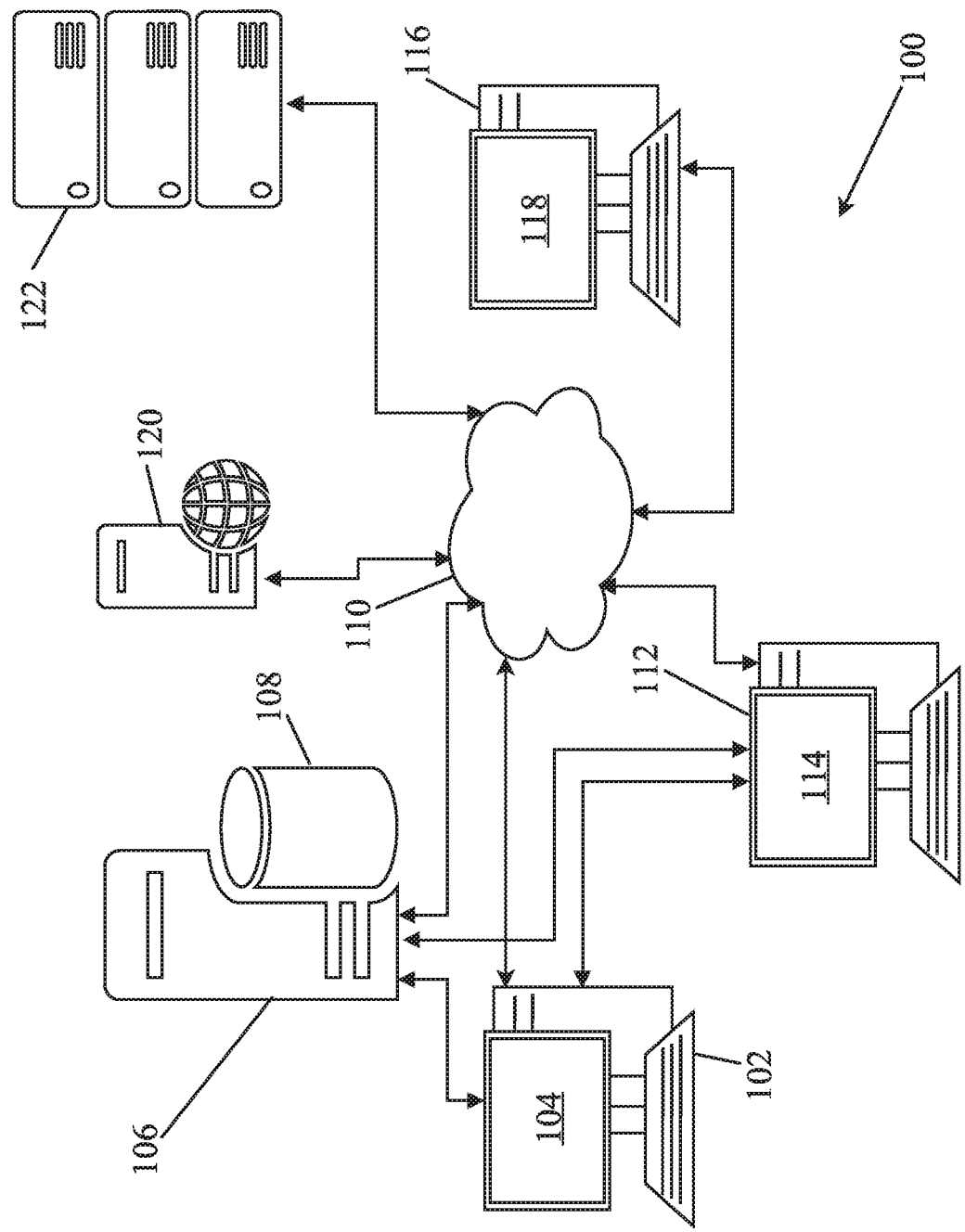
FIG. 1 is a diagram representatively illustrating an implementation of a threat modeling system (system)

The threat modeling system and related methods discussed herein are implemented using computing devices and/or networks. Referring to FIG. 1, an implementation of a threat modeling system (system) 100 is shown. FIG. 1 only shows one representative example, and there are many other contemplated systems that could be used to implement the threat modeling processes disclosed herein. System 100 includes a computing device 102 having a display 104. While the computing device is drawn as a desktop computer it could be a laptop, a mobile phone or tablet, or any other type of computing device. The same goes for all other computing devices shown in the drawings.

Device 102 is shown communicatively coupled with server 106 which is communicatively coupled with a database (DB) 108. The coupling may be directly, such as through a wired connection, or through a local area network (LAN) connection, or remotely through a telecommunication network 110 (which may be, by non-limiting example, the Internet). In some systems the server and database could be housed on the same machine as the computing device 102, for example through virtualization. In implementations device 102 could be accessed by an administrator of the system to choose settings, add or remove users, add or remove items from the database, and so forth. System 100 only shows one computing device 102, though in implementations the number of computing devices 102 may be scaled up to any number. Likewise, only one server and database are shown, but these also may be scaled up to any number as needed.

Other computing devices may be included in system 100. Computing device 112 includes display 114 and is an example of a computing device which is communicatively coupled with device 102 both directly (such as through a hardwired or wireless LAN), and coupled directly with the server (such as through a hardwired or wireless LAN), and also may be coupled with the server and/or the device 102 through telecommunication network 110. System 100 is shown with only one device 112 but in implementations it could be scaled up to any number of devices 112.

Computing device (device) 116 is an example of a computing device that is not directly coupled with either device 102 or the server but is only coupled thereto through the telecommunications network 110. Nevertheless, device 116 may access the server and database through the telecommunications network. Although only one device 116 is shown, this may be scaled up to any number. Device 116 has a display 118, as shown.

Also shown are a web server 120 and a remote server (server) 122, each of which may be included in implementations of system 100. By non-limiting example, device 116 may access the server 106 and database through the web server 120, such as by navigating to a uniform resource locator (URL) and providing login credentials. Computing devices 102 and 112 could do the same. Although only one web server is shown, this may be scaled up to any number as needed.

None of the computing devices shown in FIG. 1 are directly coupled with remote server 122, which may by non-limiting example be a third-party server, or multiple servers (such as a portion of a server rack) or any portion thereof. System 100 could, for example, exclude server 106, and utilize only remote servers 122 which have access to the database 108 (which may be stored on the remote servers), and each of the computing devices may access the database through the remote servers and through one or more described web servers such as through one or more user interfaces displayed on the displays of the computing devices when accessing correlated URLs.

As indicated, these are only examples of how to implement a threat modeling system, and many other layouts are possible. Obviously, system 100 may also include many other elements which are not shown for brevity. Nevertheless, it may be understood that, for example, in a small business or organization wherein only one computing device may be needed to do threat modeling, system 100 could be implemented using a single computing device 102 with a database 108 stored thereon, or with one computing device 102 coupled with a server 106 and database 108 through a local connection (wired or hardwired), or using a cloud-stored database that the users access through user interfaces through remote servers 122 and/or web servers 120. In an organization in which multiple computing devices may need to do threat modeling the system 100 could be implemented using a computing device 102 having the database stored thereon, or coupled through a local or Internet connection to a database 108 stored elsewhere within the organization's computing devices such as on a server 106 or remotely on remote servers 122 accessed via a web server 120, with other computing devices 112 and/or 116 coupled either directly with device 102 and/or 106 and/or through the telecommunication network 110. In implementations in which remote servers are utilized these may be scaled up to any needed number.

The threat modeling system and methods include the modeling of threats utilizing software which users access and interact with through a variety of user interfaces, some examples of which will be described hereafter, but a brief description of the processes facilitated by the software will now be discussed with reference to the conceptual block diagrams of FIGS. 2-5.

Figure 2:
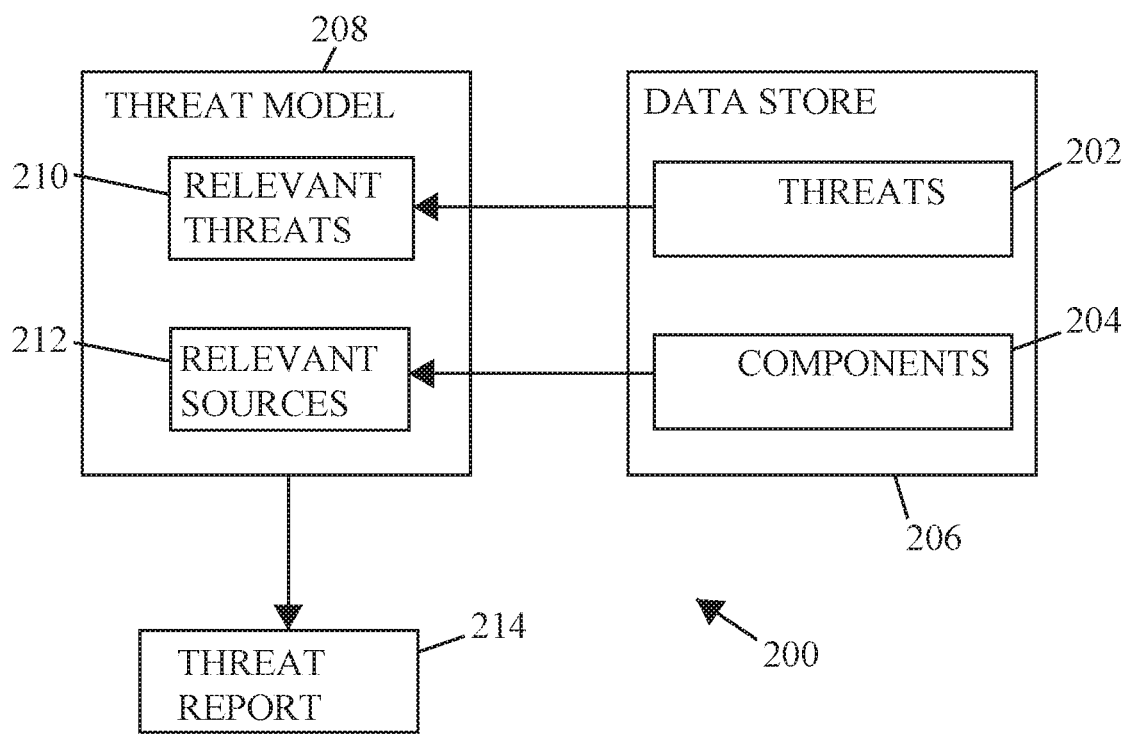
FIG. 2 is a block diagram representatively illustrating an implementation of a threat modeling method.

Referring to FIG. 2, a representative example of a threat modeling process (process) (method) 200 includes generating a threat model (model) 208 for any application, process, or system under consideration. By non-limiting example, this could include modeling the possible threats to commuting to work safely, modeling the possible threats to preventing the spread of an infectious disease, or modeling the possible attacks on a computer network (cybersecurity). Model 208 is used to generate an original threat report (report) 214 which in implementations includes identified threats, the status of identified threats (threat status), and the source(s) of identified threats, among other things.

As illustrated in FIG. 2, process 200 may include storing a plurality of threats 202 and threat model components (components) 204 in a data store 206. This may include, by non-limiting example, storing titles, definitions or descriptions, and/or associated images in the database 108 for each component and/or threat. The threats and components are used to create threat model 208.

Process 200 in implementations includes a user selecting from among the available components those components which are relevant to any given system, process or application. This is represented by the arrow between "components" and "relevant sources." The relevant sources 212 are relevant sources of threats that are determined by the system 100 either after, or while, the user is selecting the components that are involved in the specific application, system or process and defining relationships between and among the relevant components. The system also retrieves from the database relevant threats 210 that were previously correlated with the chosen components or combinations of components through the database, to form the threat model 208 (this is representatively illustrated by the arrow between "threats" and "relevant threats"). The threat model thus includes relevant threats and the relevant sources of those threats. The threat model is used to generate a threat report 214.

There may be some components with which no threat is associated (and they are therefore not relevant sources of threats), and there may be some threats that are dependent on one or more relationships between components. For example, when modeling a computing network some components may communicate with one another using a hypertext transfer protocol secure (HTTPS) protocol or instead with a transmission control protocol (TCP), and this relationship may determine whether there is a relevant threat to include in the model (or which relevant threat to include in the model). Although these relationships between components are communicative couplings and/or protocols in some instances, the relationships themselves may be considered "components" in a broad sense so that, in FIG. 2, the potential relationship types between components would themselves be considered components 204 that are stored in the data store and which the user utilizes to build a diagram of the system, application or process.

FIG. 2 is a simplified diagram. Each component and each plurality of components is a potential relevant source for one or more threats. For example, one threat may be "Bluejacking" and one component, which would be correlated to this threat through the database, could be "BLUETOOTH port." Accordingly, if a user includes a BLUETOOTH port in a diagram of a computing system the system 100 will identify that port as a relevant source for bluejacking in the associated threat model and threat report. The component in this example is a physical component of a computing device or system/network. In other implementations components/sources may not be physical components. For example, if one is modeling the threats involved in commuting to work safely one threat may be "freeway collision" and one component, which would be correlated with this threat through the database, would be "merging onto freeway." Thus, in this latter example "merging onto freeway" would be a relevant source for "freeway collision." In this example the component (and relevant source) is defined as an action or step, and not as a physical component.

Regardless of whether the threats and components/sources are physical elements or steps, actions, etc., the database allows for the correlation of any threat to any number of components and likewise, the correlation of any component to any number of threats. Accordingly, using the above example, the BLUETOOTH port may be defined as a relevant source for a Bluejacking threat, but it may not be the only relevant source (another source may be a BLUETOOTH device wirelessly connected with the system being analyzed). Similarly, Bluejacking may be defined as one threat that may occur due to vulnerabilities of the BLUETOOTH port, but there may be other vulnerabilities or threats that are present in the system due to the BLUETOOTH port.

Figure 3:
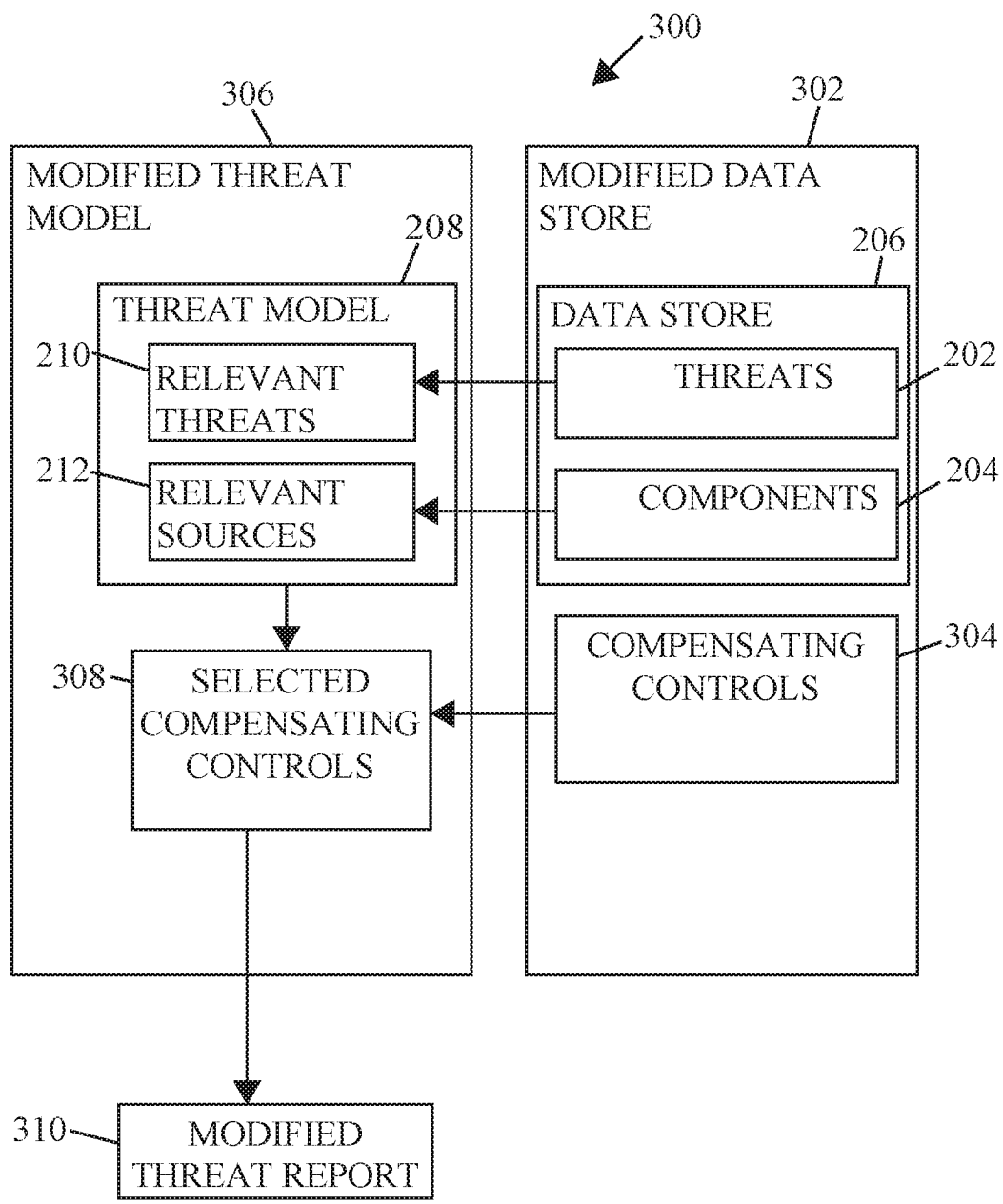
FIG. 3 is a block diagram representatively illustrating an implementation of a threat modeling method.

Referring to FIG. 3, another implementation of a threat modeling process (process) (method) 300 is shown. Method 300 includes the steps described above with respect to FIG. 2 but also includes additional steps. A modified data store 302 includes data store 206 but also includes compensating controls 304 stored in the database. The stored compensating controls include, by non-limiting example, a title, definition, image, and/or other items for each compensating control. Each compensating control may be associated with one or more threats and/or with one or more components and/or with one or more security requirements through the database (security requirements may in turn be associated with one or more components and/or one or more threats through the database). Method 300 includes user selection of one or more compensating controls (relevant compensating controls 308) from among the compensating controls 304, and the relevant compensating controls together with the threat model 208 previously discussed (in other words the relevant threats 210 and relevant sources 212) are included in the modified threat model 306. Modified threat model is used to generate modified threat report 310.

Figure 4:
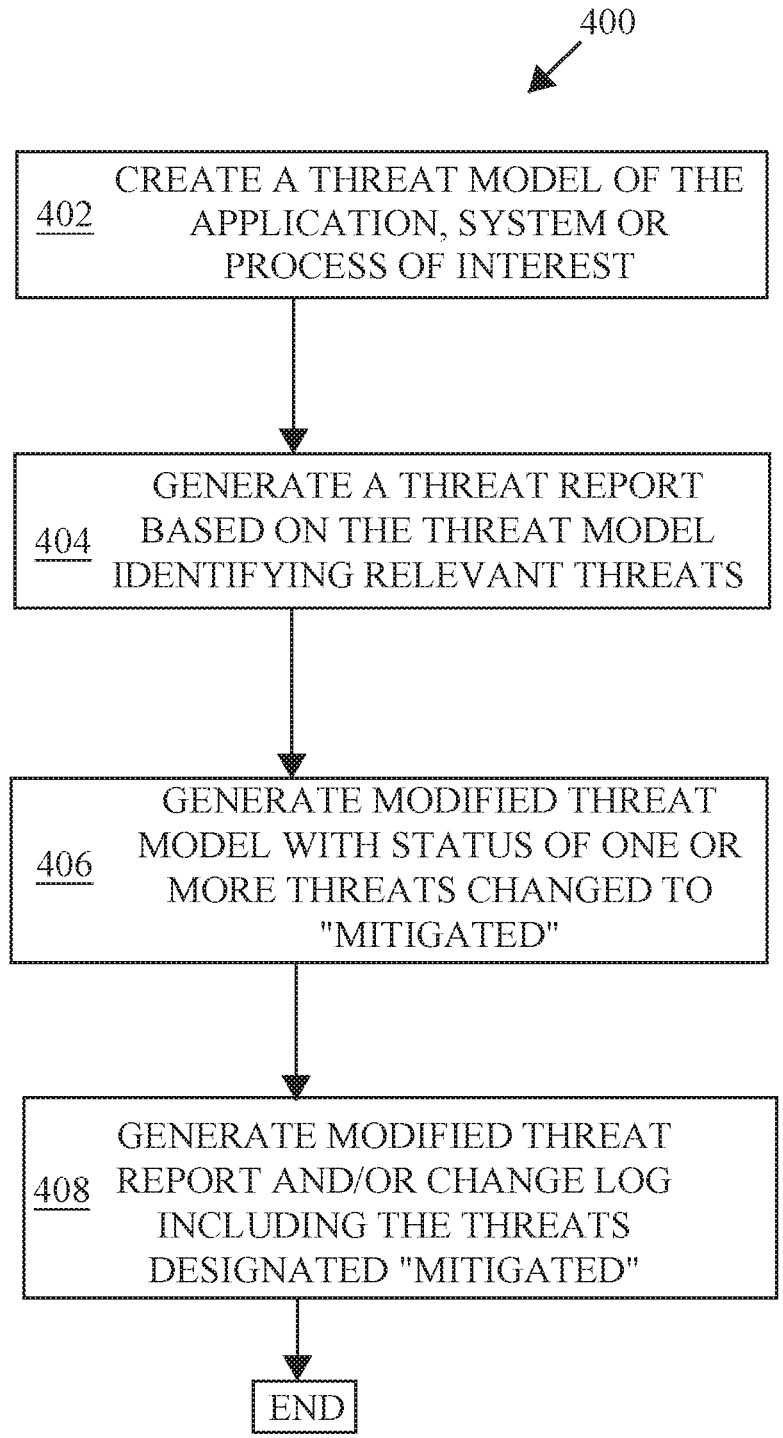
FIG. 4 is a flowchart representatively illustrating an implementation of a threat modeling method.

Referring now to FIG. 4, method 300 may include other steps and may be shown by threat modeling process (process) (method) 400 which includes creating a threat model of the application, system or process of interest (step 402), generating a threat report based on the threat model identifying relevant threats (step 404), generating a modified threat model with the status of one or more threats changed to "mitigated" using one or more of the relevant compensating controls (step 406), and generating a modified threat report and/or a change log including the threats designated as "mitigated" by the one or more relevant compensating controls (step 408).

Figure 5:
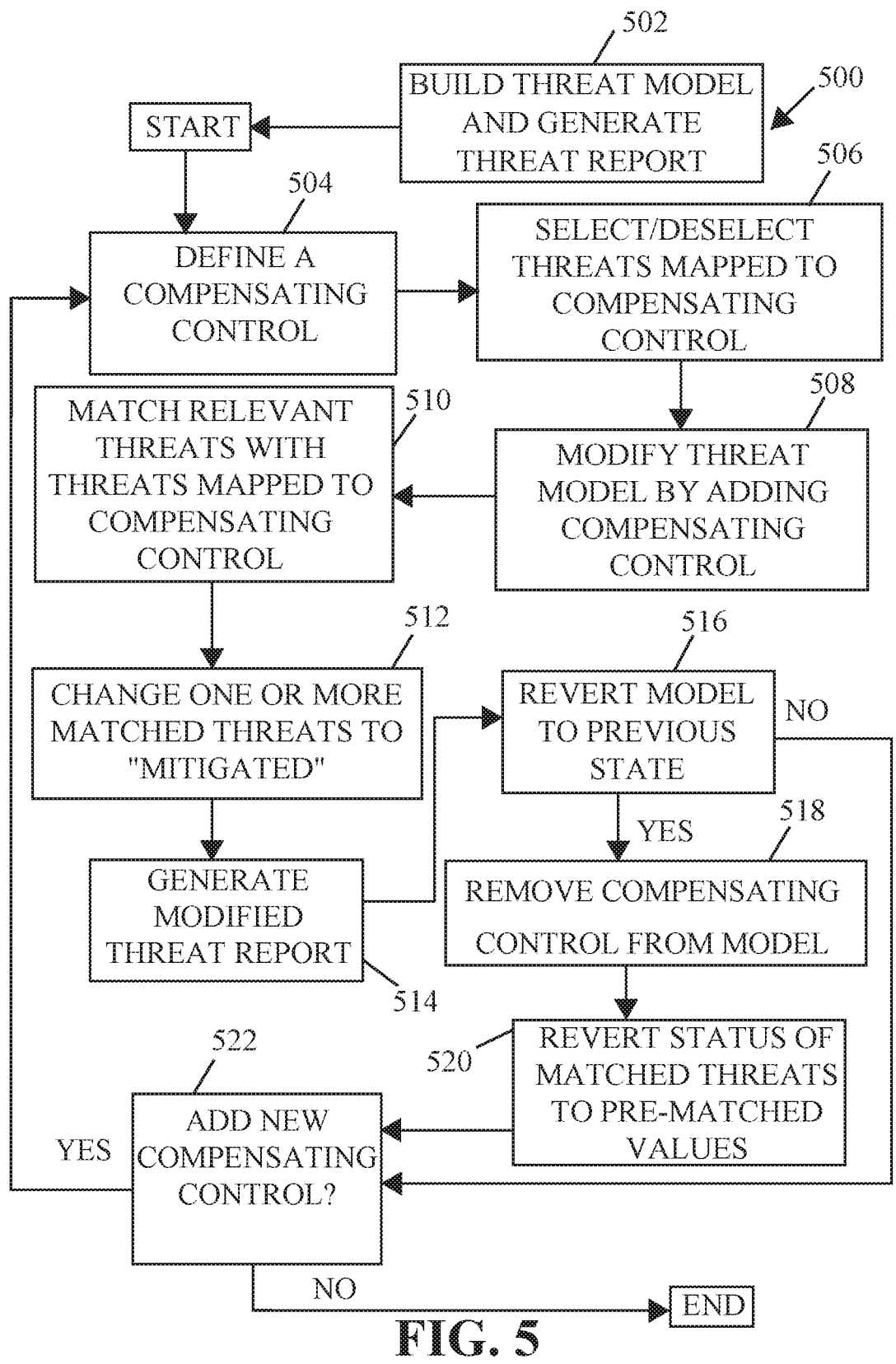
FIG. 5 is a flowchart representatively illustrating an implementation of a threat modeling method.

Referring now to FIG. 5, another implementation of a threat modeling process (process) (method) 500 is representatively illustrated. Method 500 includes cycling through the process of selecting a compensating control as often as the user chooses. After the threat model is initially built and the initial threat report is generated (step 502) the user may define a compensating control (step 504) (this step may also be done before the threat model has been built or the threat report generated). The user may select the threats mapped to the compensating control and/or deselect threats mapped to the compensating control (step 506).

The user may add the compensating control to the threat model and thereby modify the model (step 508). System 100 matches threats identified in the original threat model with those mapped to the selected compensating control (step 510). The user at this point may be able to further modify the threats mapped to the compensating control. The status of every matched threat may be changed to "mitigated" or some other status by the user (step 512). A modified threat report may then be generated (step 514). The user is then brought to a point at which he/she may select whether to revert the model to its previous state (step 516). If the user selects to not revert the model, the process skips to step 522, otherwise the compensating control is removed from the model (step 518) and the status of matched threats are reverted to their pre-matched values (step 520). The user then determines whether to add another compensating control (step 522) and if not the process ends, otherwise the process cycles to step 504 again.

Reference will now be made to several example user interfaces which may be utilized to accomplish the above general processes and other processes as will be described. It should be stressed that these are only examples, and that other user interfaces could be used to accomplish the methods. Similarly, although specific user interfaces are described with respect to specific functionalities (dropdown menus, buttons, fields, tags, text prediction, etc.), the practitioner of ordinary skill in the art will be able to mix and match these functionalities and/or use other functionalities with the user interfaces to make the user experience intuitive and easy. For example, in instances where a dropdown menu is present this could be replaced by a search field, or a radio button selection, and so forth. Nevertheless, the user interface implementations as depicted in the drawings are useful for a variety of reasons, as will be understood.

Referring now to FIG. 6, a representative example of a user interface (interface) 600 is shown. This interface is a knowledge base page and may be displayed on any of the displays of system 100 shown in FIG. 1, depending on the particular system setup. Interface 600 has a number of selectors or menu items near the top of the screen such as, by non-limiting example, a three-bar menu selector, a "select all" selector, a "new" selector, an "edit" selector, a "delete" selector, a "copy to library" selector, a "select library" dropdown selector, a "home" selector, a "knowledge base" selector, a "templates" selector, a "profile" selector, a "change password" selector, and a "sign out" selector. In implementations some of these selectors may be further organized into dropdowns so as to take up less real estate on the interface. Additionally, in implementations of system 100 some or all of the menu items just listed may be present on other interfaces, such that they are permanent menu items at the top of those other interfaces as the user navigates from one interface to another.

This "knowledge base" interface is an interface where the user may view and edit "components" that are stored in the database. The title "components" is thus present at the left near the top of the screen, and below this are three columns for "name," "type," and "labels." Below the column titles are search boxes where a user may begin typing and predictive text will bring up a list of items that begin with the letters typed so far. Each row shows one component type, name, and labels (if any). The list is scrollable as indicated by the scroll bar, and only a small number of components are listed here. So, for example, the topmost item is a WiFi router (named WIFI RTR in shorthand, and this and any other text used in the system may be in some type of shorthand or may be spelled out in its entirety in various implementations), its type is "Device," and no labels are applied. Shown in FIG. 6 are the following types: device, IoT device (which represents "internet of things" device), communication protocols (such as HTTPS), generic data store, database, application component, and deployment component. Other available types not shown may include, by non-limiting example: cloud, external system, FTP server, generic external interactor, generic process, generic trust boundary, Modbus, perimeter control, third party software, third party library, transaction, WINDOWS application, WINDOWS OS, and so forth. These are only representative examples, and the user may define new types as desired and apply those types to a new component (or existing component), which will associate the type with the component name through the database. The rows may be organized in alphabetical order by any of the columns (name, type, labels) by clicking on the title of the column and may be organized in reverse alphabetical order by again clicking on the same column header (and toggled with continued clicking). The labels column may be useful for, among other things, searching for components that have a label applied. For example if the user is looking for embedded system components, the user may search in the labels column for "embedded system" (or a shortened version if the system uses a shortened version) to find all components that have the embedded system tag applied.

A user may select any row by clicking anywhere in that row. The selected row will be highlighted, as representatively illustrated in FIG. 6 wherein the "login" row is highlighted. Once a row is highlighted any data associated with the component through the database is shown to the right. For example in the middle of the screen the component name "login" and its type "application component" are shown. Below this the tags applied to this component are shown, which in this case include: web, application, feature, authentication, password. A description can be associated with the component through the database—in this case no description has been provided. If a user desires to edit the name, type, labels, or description the above "edit" selector may be selected and the user will be able to input new information for any of these fields, which upon pressing a "cancel" button will revert to the prior data or upon pressing a "save" button will write the new data to the database.

Interface 600 also shows a "properties" section to the right, which shows the threats and security requirements associated with this component through the database. The user may press the plus icons to add new threats or security requirements, as desired, or may use the "X" icons to remove threats and/or security requirements associated with the component through the database. In this example the login component has the following threats associated with it: inducing account lockout; session hijacking; and clickjacking. The security requirements associated with the component in this example are: parameterized queries—dynamic SQL; breach—randomizing secrets per request; and encryption algorithm (the first two only show a short description on the interface screen for ease of viewing).

The threats and security requirements associated with the component through the database will at least partially facilitate the later threat modeling when a user is depicting a specific system layout. For example, if a user is depicting a computer system layout and adds the "login" component to the system layout then one or more or all of the associated threats may become "relevant threats" to the overall system as previously described. In some systems 100 all the threats associated with this element would become "relevant threats" to the specific application, process, or system being modeled, and in other systems 100 some of these threats may be automatically dropped from "relevant threats" for the specific application, process or system being modeled if other components added to the system (such as an HTTPS protocol instead of HTTP protocol) would inherently mitigate these threats.

With regards to the other selectors, a user may select the "select all" option to select all components then listed (if the user has done a search this would limit to selecting all those components populated by the search), and the user may then press the delete selector to delete all of these components and their relationships (associated threats, security requirements, tags, descriptions, etc.) from the database. The user may instead, once all are selected, press the "copy to library" selector to copy the selected items to a default library set up by the user previously through another interface. The user may similarly select only one or a few components to delete or copy to the default library. The "select library" selector allows a user to display various libraries, here the "Threat-Modeler" library is displayed but the user may create his/her own libraries, may view other built-in libraries or third-party libraries accessible through the interface through a web server or other server which communicates with another third-party database, and so forth.

The user may select the "new" icon to bring up a popup interface in which the user may define a new component, giving it a name, selecting the component type from a dropdown menu, adding an image to be displayed to represent the component (such as a lock for a security feature, a USB indicator for a USB device, etc.), labels, and a description, and may then select a "cancel" selector to cancel the new component or may select a "save" selector to write the new component information and relationships to the database, and selecting either save or cancel will also remove the popup interface and revert back to interface 600.

The home menu item at the top right of the screen will navigate the user to a home screen. The knowledge base icon will navigate to interface 600. The templates selector navigates to an interface similar to interface 1000 of FIG. 10 (hereinafter described) but with a blank canvas 1002 for creating a new template which may be used later for creating other relational diagrams (diagrams) 1004 (also described hereafter). The profile selector allows the user to bring up a popup window which displays the current user's name, email, department, role (admin, etc.), and last login date/time as stored in the database, and a close button to close the window. The change password selector brings up a popup window to change the user's password with a "close"

selector to cancel the change and a "save" selector to write the new data to the database. In implementations the home, templates, and knowledge base icons are permanently displayed at the top of all interfaces of system 100 and the profile, change password, and sign out selectors are available from a dropdown icon which is also displayed at the top of all interfaces of system 100. The sign out selector allows the user to log out of the system. Interface 600, as well as other interfaces of the system, may also include a refresh selector to refresh the page and a help icon to bring up a help menu. An icon displaying a title and/or logo of the software may also be displayed at the top of the screen (such as the top left) which when selected may navigate to the home screen.

Figure 7:
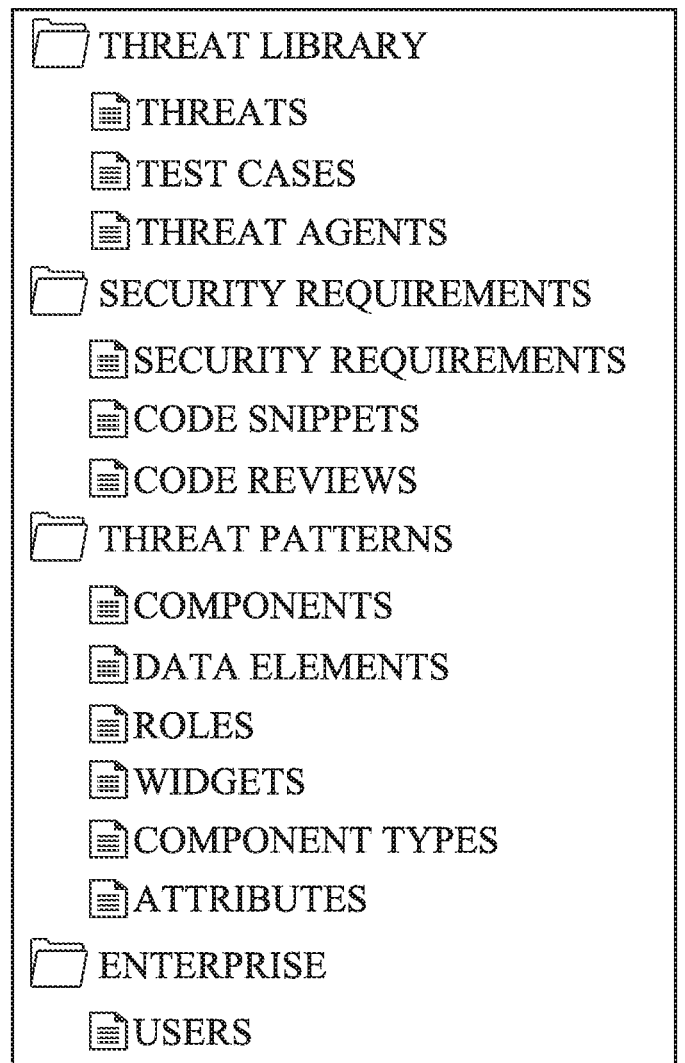
FIG. 7 is an implementation of an interface of the system of FIG. 1.

When the triple-bar menu icon is selected it brings up a popup expandable menu which, when all items are fully expanded, appears as interface 700 of FIG. 7. The "threat library" menu item includes the sub-menu items "threats," "test cases," and "threat agents," the "security requirements" menu item includes the sub-menu items shown, the "threat patterns" menu item includes the sub-menu items shown, and the "enterprise" menu item includes the sub-menu item "users." When any of the sub-menu items are selected an interface very similar to interface 600 is displayed.

For example, FIG. 8 shows interface 800 which is accessed by selecting the "threats" sub-menu item. The title "threats" is shown near the top of a list of threats which are organized into rows and columns showing each threat's name, risk level, and attached labels. A number of threats are shown and any column may be searched using the search box directly below the name, risk, or labels headers, which behaves similarly as described for FIG. 6, and the data may be organized alphabetically (or reverse alphabetically) by any column as described with respect to interface 600. The selected threat is highlighted and its information is displayed to the right, including the name, risk level, labels, and a description, which in this case includes a URL. The properties section includes threat agents which may be added, though none are added to this threat—but examples include things like "insider," "black hat," "hacktivist," "cyber terrorists," "authorized external user," and so forth which are threat agents that had previously been identified by the user. Threat agents may be added and removed. Test cases may also be added and removed, this threat has three test cases added which were previously entered into the database by the user. Security requirements may also be added by the user, and in this way compensating controls may be associated with specific threats through the database—this is one of the ways the system facilitates step 506 of FIG. 5. Security requirements may be added to the database originally through another interface, described hereafter, and identified there as a compensating control, then added to a specific threat from interface 800. Such an association through the database facilitates the system displaying various compensating controls in a diagrammed system, method or application and the threats those compensating controls can mitigate.

The menu items at the top of FIG. 8 are the same commands/links as those shown in FIG. 6 but are shown here in icon format to give another representative example, where the select all selector is represented by a checkmark, the new selector is represented by a plus icon, the edit selector is represented by a pencil icon, the delete selector is represented by an "X" icon, the copy to library selector is represented by an icon of two documents, the home selector is represented by a home icon, the knowledge base selector is represented by a file folder icon, the templates selector is represented by a document icon, and the profile, change password, and sign out selectors are available by selecting a dropdown menu represented by a downward facing triangle icon.

Referring back to FIG. 7, if the "test cases" sub-menu item is selected an interface similar to interfaces 600/800 is displayed, but showing test cases, and allowing the user to add, edit, delete, copy, add labels, and so forth, similarly as previously described with respect to the "threats" sub-menu item. The threat agents, security requirements, code snippets, code reviews, components (already described with respect to interface 600 since the components interface is set as the default interface when the "knowledge base" selector is selected), data elements, roles, widgets, component types, attributes, and user sub-menu items all have similar functionality and bring up similar interfaces when selected. It will be pointed out that data elements, which represent data elements that may be captured by any diagrammed system, application or process (such as credit card numbers, billing addresses, pins, phone numbers, email addresses, order history, birth date, medical history, insurance history, and so forth) may be associated with specific threats and with specific security requirements in the same way as these associations may be made for components.

If a user selects the security requirements sub-menu item an interface similar to interfaces 600/800 will be shown similar to interface 900 of FIG. 9, which allows the user to order security requirements alphabetically (or reverse) by name or label and search for specific security requirements. Selecting any security requirement will highlight it and display its name, description, labels, an indicator to indicate whether the security requirement is a compensating control, and any code snippets or code reviews (under a "properties" header) that have been associated with the security requirement (which may be added or removed from that interface similar as described with respect to the "properties" elements of interfaces 600/800).

Interface 900 is actually the interface visible when the user selects the "new" selector to create a new security requirement. From this window the user may add a name, add a description, check a box (or leave it blank) to indicate whether the security requirement is a compensating control, add any labels (which are previously input into the database by the user), and press cancel to abort the addition or press save to write the data to the database.

From any of the previously mentioned interfaces, if the user presses the home selector an interface similar to interface 1300 of FIG. 13 will be displayed, which lists all previously stored threat models by name and showing their version. Either column may be organized alphabetically or in reverse, and the PDF button will export the list to PDF. If any specific threat model is selected it will be highlighted and its associated threat report (threat report interface) 1302 will be displayed, which will be discussed hereafter. From the top menu items the user may select the new selector to create a new threat model, the edit selector to edit the name, version, risk level, an "internal" toggle, and labels associated with the selected threat model, a delete selector to delete the selected threat model, a diagram selector to view the diagram for the selected threat model, a report selector to export to PDF the threat report (which shows for each threat the threat name, source, risk level, status, and creation date), a threat tree selector to view a diagrammed threat tree, showing threats of the threat model, and other selectors already described.

Figure 14:
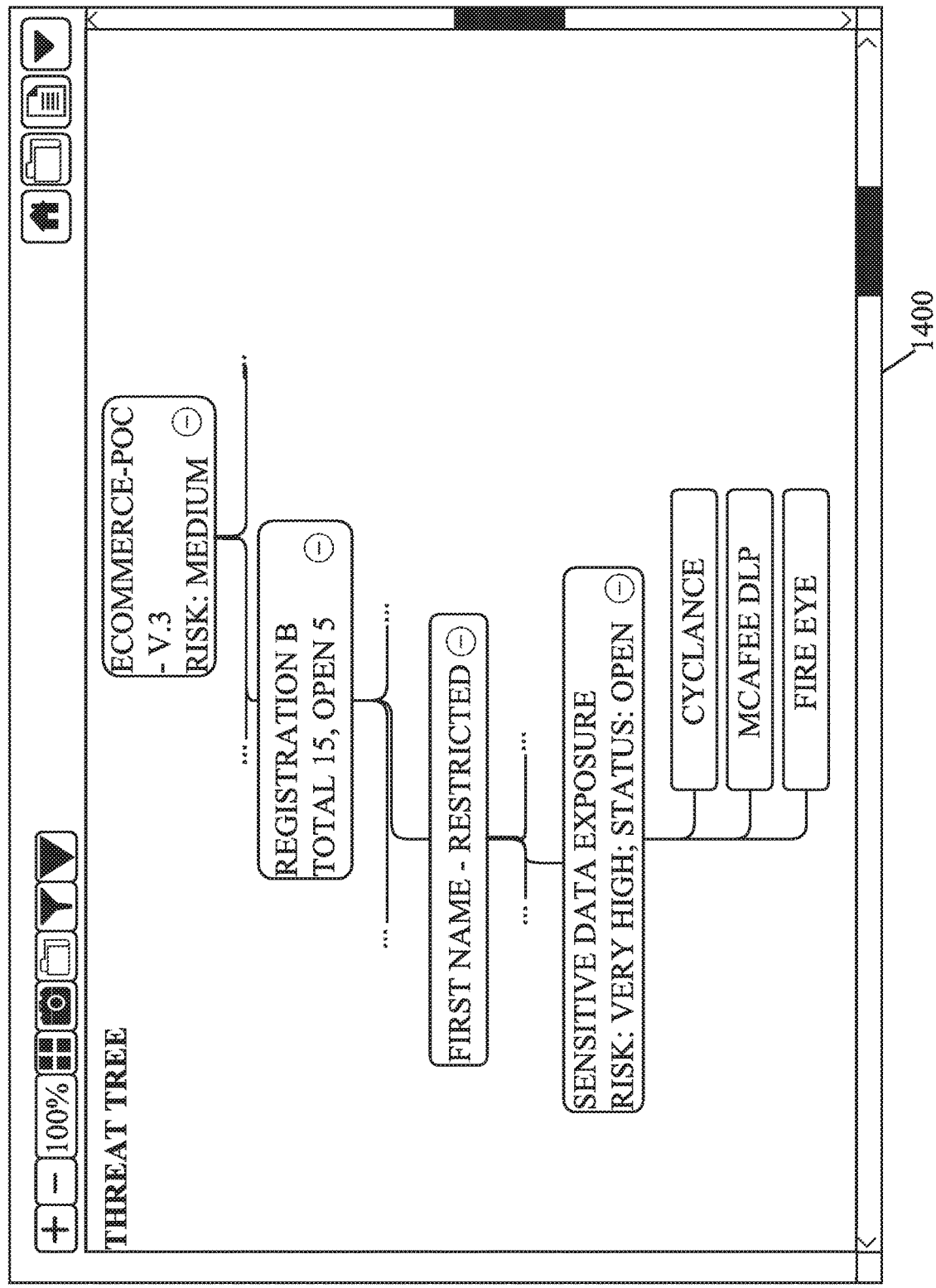
FIG. 14 is an implementation of an interface of the system of FIG. 1.

If the threat tree selector is selected a threat tree is displayed in which threats are organized as sub-elements of data elements and/or components, and also displayed are mitigating security requirements or compensating controls that may be implemented to mitigate the threats and an indicator of whether each threat has been mitigated. Portions of the tree may be collapsed, expanded, or viewed in vertical tree or horizontal tree format. The interface showing the tree diagram has selectors to zoom in, zoom out, revert to 100% zoom, toggle on/off a thumbnail overview image in a corner of the display, save an image of the tree, open a legends window which shows the colors in which various elements are diagrammed (threat agent, widget, component, role, data element, security requirement, threat, protocol, node, and project), and a filter selector which allows the user to remove and add back in any of the aforementioned items from the tree. The tree may be dragged and moved in any direction for viewing any portion of it easier. p For example, FIG. 14 shows an interface 1400 which displays such a tree diagram, though portions of the tree are not shown (but represented as three dots) for ease of viewing the portion being discussed. The topmost tree item is the threat model name and displays an overall risk level which was previously input by the user. From this topmost item several branches extend, each representing a component or data element or node or the like —here "Registration B" is one of multiple nodes each of which include several data elements or components. Registration B is shown to have 15 total threats, 5 of which have a status of "open." Registration B has several data elements, one of which is "First name." This data element has several threats that have been associated with it through the database previously (as described above), one of which is "Sensitive Data Exposure." This threat is displayed along with its risk level and its status, here "open." This threat has had associated with it, through the database, three security requirements: CYCLANCE, MCAFEE DLP, and FIREEYE (such as through interface 800 as previously described), and accordingly one or more of these security requirements may be indicated as mitigating the threat in another interface, at which point this tree will alter to display this threat as "mitigated." Each level of the tree is seen to have a minimize selector to minimize all lower levels if desired, which when selected changes to a plus icon to expand the below portion as desired.

The menu items at the top left are presented as icons: a plus sign for zooming in, a minus sign for zooming out, a "100%" selector for reverting to 100%, a grid icon for displaying a thumbnail overall view in the corner of the tree as currently expanded, a camera icon for saving an image of the tree as currently expanded, a file folder icon for viewing the legend previously described, a filter icon for modifying which elements are shown or not shown, and a dropdown arrow (downward-facing triangle) for selecting a horizontal or vertical (as displayed in FIG. 14) orientation.

Returning to FIG. 13, if the new selector is selected (which, as with all other selectors, could be implemented as an icon or logo absent any wording), a popup window appears allowing the user to enter a name, version, toggle an "internal" indicator, select a risk level from a dropdown (from among previously determined risk levels stored in the database), apply labels (which allow the user to type and populate a list of already entered labels stored in the database to select one, or to add a new label by typing a new item and selecting "add new"), or the user may select a "new from template" button to begin a new diagram from an existing diagram template, or a "new from features" button to begin a new diagram from user-selected features, or the user may select "import" to begin a diagram from a previously stored diagram (such as from an older version of the software), or the user may select "empty" to begin a diagram with a blank canvas.

Figure 15:
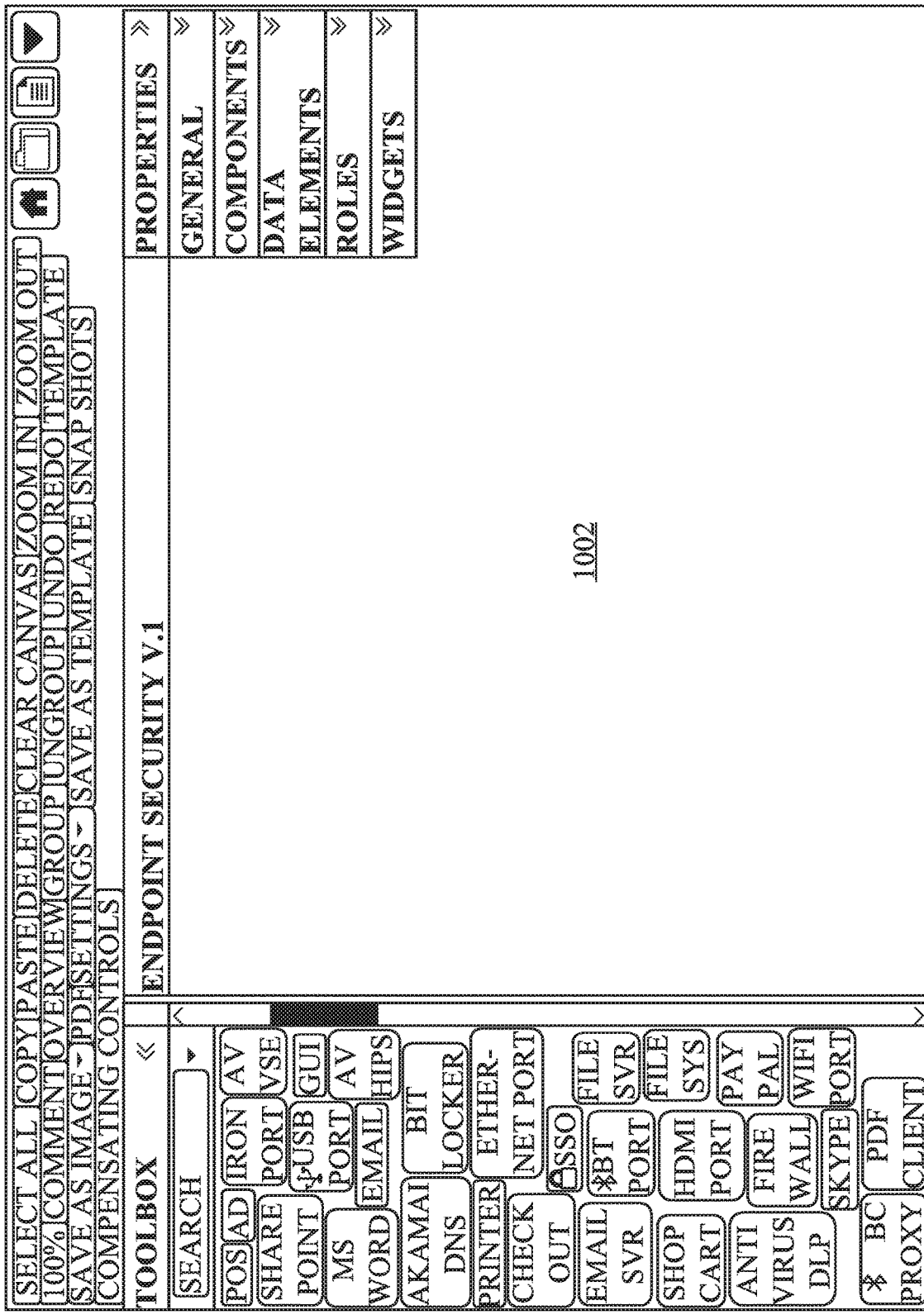
FIG. 15 is an implementation of an interface of the system of FIG. 1.

If the user selects "new from features" the diagram interface of FIG. 15 displays with a blank canvas 1002, and a popup selector (not shown) allowing the user to select "business requirement" features which are desired to be included in the model such as, by non-limiting example, authentication, funds transfer, credit verification, bill pay, or other features already stored in the database previously by the user, and after selecting the desired features, the blank canvas will populate with a node for each feature. The user can then modify and/or add components to the diagram as desired.

If the user selects "empty" the diagram interface (interface) 1000 of FIG. 15 will appear, showing the blank canvas 1002 as shown. To the left of the canvas is a toolbox module which may be minimized using the left facing double arrows and re-expanded by selecting the same arrows which will then be right facing. To the right of the canvas is a properties module which also may be minimized and expanded in similar fashion, along with sub-menu items "general," "components," "data elements," "roles," and "widgets" each of which may be expanded downward or minimized upward using the double arrows (in FIG. 15 they are all minimized).

The toolbox module is searchable, with the user able to begin typing and the system suggesting through a list populated just below the search box components which begin with the letters (or include the letters) typed by the user. The dropdown to the right of the search box may be used to allow the user to search from among all components or a subset such as one or more specific component libraries as previously discussed, with ThreatModeler being an example component library) and/or one or more specific component types as stored in the database (and previously discussed with respect to FIG. 6). The user may also scroll down through the components using the scrollbar function.

Figure 10:
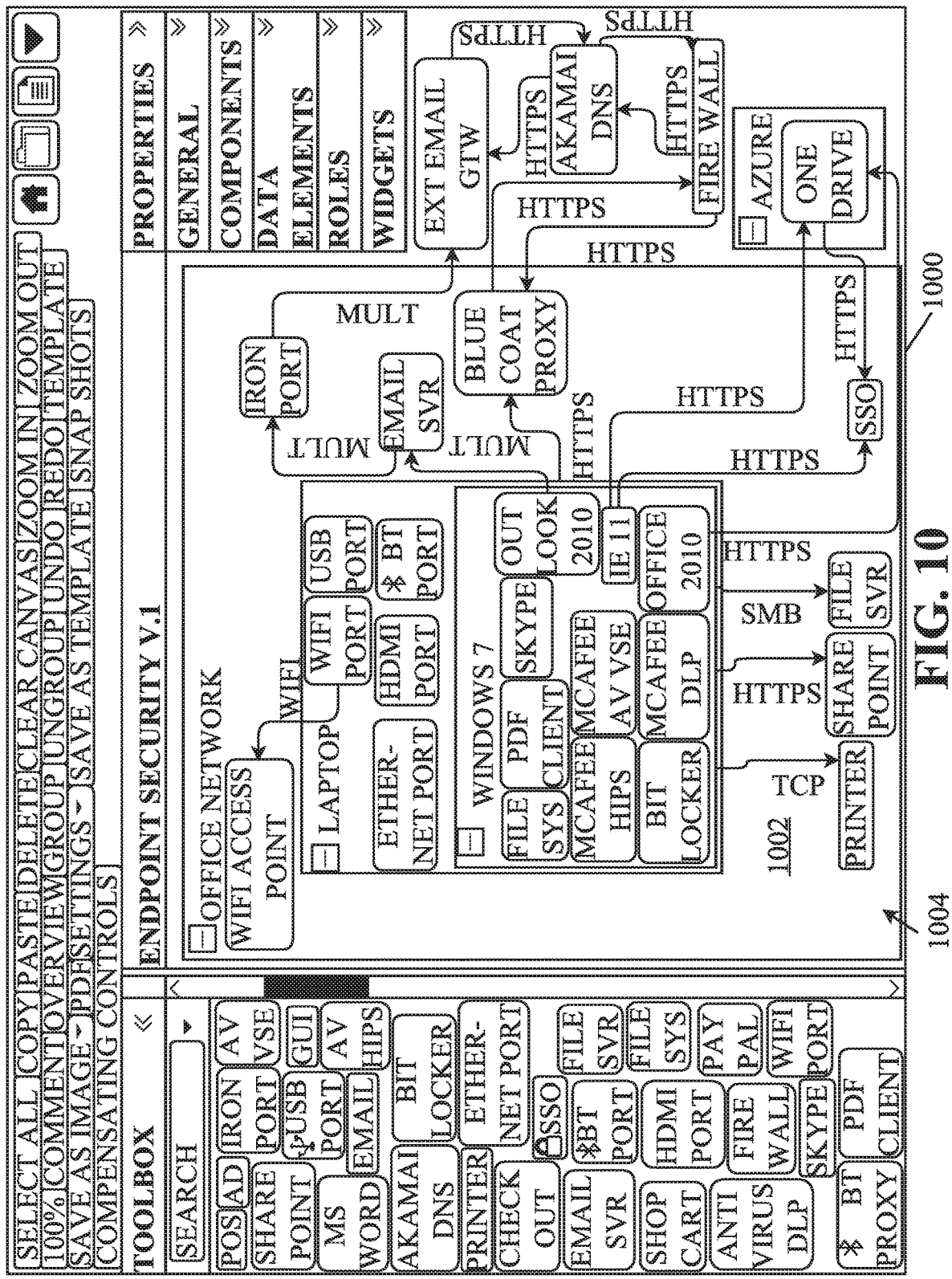
FIG. 10 is an implementation of an interface of the system of FIG. 1.

In the example of FIG. 10 the components in the toolbox are of varying sizes, but in implementations they will all be of similar sizes and shapes (or identical sizes and shapes). In implementations in which the system is deployed within a single organization with only a local library of components the tools listed in the toolbox will be those that have been input by the user or that were previously loaded into the database during software installation. In implementations in which the system includes some remote communication with other libraries the toolbox may display tools available from other parties, such as through a cloud computing services, e.g., MICROSOFT AZURE or the like (indeed the entire system and methods could be implemented using cloud computing in instances where a local software installation or local database are not desired).

The toolbox, as can be seen, includes components that were previously entered into the database through interface 600 as previously described. From interface 1000 the user may select a desired component and drag it to a desired location on the canvas, and by dragging multiple items the user may begin to add the components of a system, application or process to be modeled. By non-limiting example, FIG. 10 shows interface 10 with a relational diagram (diagram) 1004 already fully created by the user. As can be seen, the user has dragged multiple components onto the canvas 1002 and has defined various relationships between them. The user dragging components to the canvas is one way in which the user selects relevant components or relevant sources as described with respect to FIG. 2, and it is from these relevant components (relevant sources) that the system identifies relevant threats by identifying the threats that are associated through the database with those components.

In implementations a communication protocol (protocol) can be defined between components by clicking on a component and dragging the cursor to a second component. This will create an arrow, such as those shown on FIG. 10 between components on the canvas, and will display a default protocol (here the default protocol is HTTPS), but a user may right click the arrow to display a popup selector allowing the user to deselect HTTPS and/or select one or more other protocols (such as TCP, SMB, WiFi, 3G, 4G, AJAX, binary, BLUETOOTH, FTP, FTPS, HTTP, IMAP, MAPIRPC, SMTP, SMTPS, USB, etc.), at which point if one protocol is selected that protocol name will be displayed and if multiple are selected then "multiple" will be displayed (in the image this is shown as "MULT" for short)—these protocol arrows will also be color coded by type (such as green for HTTPS, red for multiple, and so forth). Protocol arrows may also be deleted as desired. The descriptions are shown here next to the link arrows, but in implementations the wording may be superimposed over the link arrows. They are shown here next to the arrows for easier readability.

The components displayed in the toolbox are generally shown without icons. The USB Port, SSO (single sign on), BLUETOOTH PORT, and BLUETOOTH PROXY components are shown with icons as an example that all components may be shown in the toolbox with an icon if desired. It may also be seen that the user may input components that constitute branded software elements, such as PAY PAL, AKAMAI DNS, SKYPE, etc.

As a user adds components and links them together, the threat model includes the threats that are associated with the components/protocols. As previously described, each component, each protocol, and each data element may be directly associated with one or more threats through the database. Accordingly, each time a component is added to the diagram, or a new link drawn between components and protocol selected, if there are any threats associated through the component and/or protocol those threats are then included in the threat model. A user may at any time right click on a blank area of the canvas when no component/link is selected and a "threat report" item will be selectable which, when clicked, will generate a popup threat which will include a list of all threats. This will look much like the threat report 1302 shown in FIG. 13, and will include a first "threats" tab list of all threats (and the number of threats), identifying the risk level of each threat, showing the threat status (open/mitigated), identifying the source of the threat (which is a component on the diagram), and having an actions column from which the user may display a description of the threat (previously associated with the threat through the database) (the description selector here shown with the letter "D" though the selector could instead show "description" or the like) and leave a comment to store to the database (the comment selector having the phrase "note" though in other implementations it could say "notes" or "comment" or the like). The user may organize the table by any column (alphabetically or reverse) and may also organize by column headers by dragging the column headers to the location indicated. For example, the user could drag the "status" header to the identified location and then drag the "risk" header to the right of it and the table would then be organized first by status and then by risk level. When this "dragging" is done a "ghost header" is dragged up to the identified location in the sense that the existing header remains in place. The organization may be reverted to an earlier state by deleting the ghost headers using an "x" icon.

The threat report displayed also includes a security requirement tab (showing number of security requirements) and displaying a table similar to the threats table. The security requirements table lists the security requirements that are associated with one or more of the identified threats in one column, lists a source in another column (which is the component associated with the threat), includes an "implemented" column indicating whether the security requirement has been implemented, an "optional" column indicating whether the security requirement is optional, and a similar "actions" column to the previously described actions column, this time the description giving a description of the security requirement and allowing the user to record a written note. This table may be organized similar to the previously described table.

With respect to the "implemented" column, in implementations this is a checkbox for each security requirement indicating whether the security requirement has been implemented. The user may manually check those security requirements that have been implemented and manually uncheck those that have not. This column may also have been previously populated with some "implemented" checkmarks based on mitigations that the user has selected for specific compensating controls, which will be discussed later with respect to FIG. 11. Further, the "optional" column may also be checkboxes which a user may manually toggle to indicate which security requirements are optional or not. This column also may be populated by the user selecting certain mitigations as will later be discussed with respect to FIG. 11—for example if there are two security requirements associated through the database with a specific threat, but only one needs to be implemented, then if the user selects one of those security measures as mitigating the threat the other security measure may populate on this list as being checked "optional."

The threat report further includes a "test cases" tab (showing the number of test cases) and displays a table listing test cases associated with the threats through the database. As previously described with respect to FIG. 8, each threat may have test cases associated with it. An example test case would be, for example, a "dictionary-based password attack" for a password-related threat. The test case tab would list this test case and have an "actions" column which, when an icon is selected, pops up a description, which in this case states "use a password cracking tool what will leverage the dictionary to feed passwords to the system and see if they work" and further list techniques like setting the test to try all words in the dictionary, common misspellings, and combinations of words and common misspellings of combinations. The test case tab/table thus offers tests that the user may try to test against the threats both before and after security requirements are implemented. This table may be organized and sorted similar to the previously described tables.

The threat report further includes a "code reviews" tab (showing the number of code reviews) and displays a table listing the code reviews that are associated with the security requirements through the database (as previously shown with respect to FIG. 9). An example code review would be, for example, an "Authentication: Weak Password" code review. The code review table would list this code review and have an "actions" column which, when an icon is selected, pops up a description, which in this case states "Password strength should be enforced upon a user setting/selecting one's password" and gives examples of code that may be used to set up such an enforcement. The code review tab thus offers sample code that the user may use to implement measures against threats which may complement or work together with implemented security requirements. This table may be organized and sorted similar to the previously described tables.

Multiple selectors are shown at the top of interface 1000 in addition to the permanent selectors that are available on several interfaces. The "select all" selector selects all components on the canvas (the user may then deselect some, if desired, for example for grouping some or all the components as later described). The "copy" selector copies selected components and the "paste" selector pastes the copy onto the canvas (this may also be done with keyboard shortcuts, and shortcuts may in implementations be used for all other selectors described herein for system 100). The "delete" selector deletes the selected components from the canvas and the "clear canvas" selector deletes all components from the canvas. The "zoom in" and "zoom out" and "100%" zoom in and out of the canvas and revert to a 100% zoom, respectively. The "comment" selector populates an empty comment box on the canvas in which the user may type a comment. The "overview" selector displays a thumbnail overview of the entire diagram in a corner of the canvas.

The "undo" selector undoes the last action (or multiple last actions if selected multiple times) and the "redo" selector does the opposite. The leftmost "templates" selector pops up a menu from which one or more previously saved business requirement "features" may be selected to add to the canvas (these may be nodes, for example, and may be the same nodes that are described above when the user uses the "new from features" function when generating a new model). The "save as image" selector has a dropdown and allows the user to save an image of the diagram as then displayed in one of various formats such as PNG, SVG, etc., or to take a "snapshot" which saves the diagram at the present state to the database. The "PDF" selector generates a PDF of the threat report based on the current configuration of the diagram components (the threat report described to some extent above). The "settings" dropdown selector allows the user to toggle between straight or curved link lines (protocol lines/arrows), showing or hiding the link wording (in FIG. 10 the lines are curved and the link wording is shown), making the diagram public or non-public, and showing or hiding comments (the comment function described above).

The "save as template" selector allows a user to save the entire diagram as either a threat model or a business requirement "feature," and in either case the user may give the feature a name, add labels, and select the type as either threat model or business requirement, then press cancel to cancel or save to store the new template to the database. The "snapshots" selector populates a list of previously saved snapshots, any one of which may be opened from the list or deleted.

The "group" and "ungroup" selectors allow the user to create a group containing multiple components or to delete a group (but not the included components). As seen in FIG. 10 for example, there is a "WINDOWS 7 " group which includes file system, PDF client, SKYPE, OUTLOOK 2010, MCAFEE HIPS, MCAFEE AV VSE, IE11, BIT LOCKER, MCAFEE DLP, and OFFICE 2010 components. There is also a Laptop group containing the WINDOWS 7 group and further containing WiFi port, USB port, ethernet port, HDMI port, and BLUETHOOTH port components. Finally, there is an Office Network group which includes the Laptop group and also includes file server, SHAREPOINT, printer, WiFi access point, IRONPORT, email server, BLUECOAT proxy, and SSO (single sign on) components. Then there are other components (external email gateway, AKAMAI DNS) which are not part of any group. A group may be formed from any one or more components, and the AZURE group is seen containing only a single component: ONEDRIVE.

When a group is formed the user may, using the right-side "general" dropdown, add a custom display name, select a container type (from container, trust boundary, collection, or some other option stored in the database previously by the user), select a component (for example for the WINDOWS 7 the component "WINDOWS machine" is selected, which shows that some components stored in the database may include other components), select other display choices such as title and background/border color, and select a Common Platform Enumeration (CPE) identification from among a list previously stored in the database (for example in this case ID a version of WINDOWS 7 is selected) (the list of CPE IDs may be searched using filters to easily find the appropriate one), and the user may also add notes.

As further examples, the WINDOWS 7 group is identified as a container group, a WINDOWS machine, and a specific WINDOWS 7 operating system version is identified. The Laptop group shown in FIG. 10 is listed as a container group and no CPE ID is selected. The Office Network group is identified as a trust boundary group type and no CPE ID is selectable. The AZURE group is identified as a trust boundary group type and no CPE ID is selectable.

The "compensating controls" selector may be selected to display a popup similar to compensating control report (report) 1200 of FIG. 12. This report is populated from previous relations stored in the relational database. As indicated previously with respect to FIG. 6, each component may be associated with one or more threats and one or more security requirements through the database using interface 600, and as described with respect to FIG. 8 each threat may be associated with one or more security requirements through the database. As further indicated with respect to FIG. 9, each security requirement may be identified through the database as a compensating control. Accordingly, based on these relationships and selections the list populated in FIG. 12 shows all possible compensating controls that could be implemented to mitigate threats that are present in the diagrammed system, application or process.

By non-limiting example, the threat of "physical theft" is associated with the component "laptop" through the database, but no security requirements are directly associated with the laptop component. Nevertheless, the "physical theft" threat is associated with the security requirements "MCAFEE FRP" and "BITLOCKER" through the database, both of which security requirements are identified through the database as compensating controls (MCAFEE FRP being a USB encryption tool and BITLOCKER being a disk encryption tool). Accordingly, when a user adds the laptop component to a diagram, if the user selects the "compensating controls" selector this list will then include both MCAFEE FRP and BITLOCKER as compensating controls for the physical theft threat. If the user removes the laptop component from the diagram (deletes it) then the MCAFEE FRP and BITLOCKER compensating controls will no longer appear in the list (unless they are also associated as compensating controls for some other threat present in the diagram). In implementations the list populated will also show compensating controls which are directly associated with a component that is added to the diagram. In other words, in the above example there are no security requirements directly associated with the laptop component, but if a third security requirement were directly associated with the component through interface 600, and if the third security requirement was identified through the database as a compensating control, then that third compensating control would also populate in the list of interface 1200.

Referring again to FIG. 10, it may be seen that this diagram includes the MCAFEE DLP, BITLOCKER, MCAFEE HIPS, and MCAFEE AV VSE components grouped in the WINDOWS 7 group. The user may, for example have modeled the WINDOWS 7 group, then used the compensating controls selector at the top of interface 1000 to identify that there are certain threats that these components would mitigate. The user may then add those components to the WINDOWS 7 group by dragging them from the toolbox to a location within the group outline to add them to that group. Then, upon right clicking on any specific security requirement component, the user may select a "mitigations" selector which pops up mitigations interface (interface) 1100 as shown in FIG. 11. The user could add one of these components at a time and model the mitigations, generate a new threat report, then either remove that component or add another compensating control, and in this way test out various compensating controls. This is one way in which the system facilitates steps 512, 514, 516, 518, 520, and 522, among other steps, of FIG. 5.

Interface 1100 displays a table which lists all threats and their associated sources (component associated with the threat), risk levels, and status, and highlights the listed threats which the security requirement is configured to mitigate as identified previously through the database through interface 800 (these threats are "mitigatable" by the selected security requirement). The user may deselect highlighted threats and/or may highlight other threats, then may select "close" to cancel or may select "mitigate" to toggle those threats to mitigated through the database. Once this is done, for example, the threat report as seen in FIG. 13 (or popup shown from the diagram interface) will list the mitigated threats as "mitigated" and the compensating controls list shown in FIG. 12 will also show the mitigated risks as mitigated.

It is pointed out here that the threat report as shown in FIG. 13 also allows a user to manually change the risk level and threat status directly from the home menu using the "change risk" and "change threat status" drop downs once a threat is selected by clicking on any row. Changing the risk level of a threat from this interface will only change the risk level for this specific threat model. Threat statuses that may be used include, by non-limiting examples: open, closed, mitigated, fixed, not applicable, needs more details, not tested, secure usage practice, and so forth.

Referring now to FIG. 16, a representative example of a change status log interface (interface) 1600 of the system 100 is shown. Four possible scenarios exist for matching threats to any given compensating control in any given threat model, and any of these may be displayed on the change log (though in implementations the change log may be excluded and in such cases FIG. 16 simply represents the change scenarios).

The first case is illustrated by Threat 1 (which may be any defined threat). In this case the compensating control is associated with a threat through the database (see FIG. 8) but not to any particular source. This would be the case if, for example, the compensating control security requirement is associated with the threat through the database using interface 800 of FIG. 8, and two components (sources) in the diagram have been associated with that threat through interface 600 of FIG. 6, but neither component has been associated with any compensating control security requirement through interface 600. In such cases, when the "mitigate" is selected after right-clicking a component on the diagram both sources will be highlighted, and if the "mitigate" selector is then selected both will be modified to "mitigated" in the threat report.

In the second scenario the compensating control is associated with Threat 2 through the database (interface 800), and there are three components (sources C-E) associated also associated with Threat 2 through the database (interface 600) and each of which is also associated with at least one security requirement (interface 600), but only one of those components is associated with the specific compensating control through the database (interface 600). In such a scenario when the "mitigate" is selected after right-clicking a component on the diagram only the component associated with the specific compensating control will be highlighted, and if the "mitigate" selector is then selected only that threat will be modified to "mitigated" in the threat report.

In the third scenario, the user has added a compensating control component to the diagram but it is not associated with any of the modeled threats of the diagrammed system (such as Threat 3 from Source F). In such a scenario when the "mitigate" is selected after right-clicking a component on the diagram nothing would be highlighted (indicative of no original threat status being logged in the change status log) and if the "mitigate" selector is then selected the threat status will not be modified. In this case the actual threat identified by the model will still have an "open status," and Threat 3 would be visible from interface 11, it is just not highlighted so that no change would be logged if the "mitigate" selector is selected. However, as indicated previously, the user could manually highlight Threat 3 from Source F in interface 1100 prior to selecting "mitigate," if the user knows that the compensating control will actually mitigate the threat, and if the user does such a manual highlight and then presses mitigate the change log will reflect an initial threat status and a modified threat status. In such cases the change log may be configured to also reflect that the mitigation was manually selected.

Finally, the last example is shown by Threats 4 and 5. Threat 4 is mapped to the compensating control but not to any particular source, and Threat 5 s mapped to the compensating control and to Source G (a specific component). However, the diagrammed model does not include Threats 4 or 5, and accordingly the change log does not make an original threat status log and does not change the status of Threats 4 or 5. When the user arrives at interface 1100 in this instance, the Threats 4 and 5 are simply not shown.

Although the examples of computing system models have been described in detail, it is again emphasized that system 100 may be utilized to model other threats. For example, referring to a disease epidemic threat model, the threats may be sources or ways the disease may spread, the security requirements may be methods or elements to reduce the effects of those sources, such as sterilizing surgery instruments, washing hands, using air filters, breathing masks, gloves, and the components may be steps or interactions that occur with respect to persons who may be infected, such as admitting them, dealing with infected clothing, performing medical operations on them, etc. In such a scenario the threat model may have no components, threats, or security requirements that relate directly to computing devices or systems, though the threat may be modeled on system 100 which utilizes computing devices. The same may be said for the aforementioned threat model of commuting to work, and numerous other threat models, involving any of myriad types of threats, could be modeled using system 100.

Other types of threat models could include: modeling physical and technology threats to airplanes, smart homes, smart TVs, an electric grid, and so forth.

Accordingly, the system and interfaces described herein allow a user to model a variety of systems, applications, and processes to determine threats and to mitigate those threats. The user may, at any time, delete any security requirement component (which may be a compensating control component) from a diagram and then generate the threat report again to revert to the threat statuses prior to mitigation by any particular component. This is one way in which step 518 of FIG. 5 may be accomplished, since removing the mitigating component will revert the mitigated threats back to the open status (except for threats which are also mitigated by another mitigating component).

Utilizing the methods and systems described herein an organization or individual can quickly and efficiently model deployed or contemplated systems, applications and/or processes and assess relevant threats to determine a mitigation strategy. The user may assess new threats to the entire attack surface of a system, application or process as the new threats arise and accordingly develop modified mitigation strategies with minimal disruption to existing operations. Additionally, the methods and systems described herein allow users to study the ability of a compensating control to block new or existing threats without penetration testing (pen-testing), which can be resource-intensive, slow, and not as thorough as desired. The systems and methods also allow assessment of future compensating controls which have not yet been implemented (for such compensating controls penetration testing is not an option).

Any of the threat modeling described herein may utilize existing threat modeling methodologies including STRIDE, P.A.S.T.A., TRIKE, and/or VAST methodologies, which may include modeling the system, application or process as a data flow diagram (DFD) or a process flow diagram (PFD).

In implementations a compensating control record in the database may include a definition or details which include: an articulation of the rigor and intent of a prescribed security requirement which the compensating control is meant to satisfy; a defensive level of the compensating control; security and defensive capabilities of the compensating control, and; additional risk imposed by not adhering to the prescribed security requirement.

Systems and methods described herein may have other features that have not been described in detail. Users may be able to access the interfaces of the system through a web page, as described, and may be able to register using user accounts, with login credentials, functionality for retrieving lost passwords etc. Individual users may be able to import custom libraries and other elements into the database including custom components, threats, threat agents, test cases, security requirements, code snippets, code reviews, data elements, roles (developer, customer, user, admin, etc.), widgets, component types, attributes, templates, threat models, and the like. In implementations widgets may be a subset of components and may include reusable modular components that may be included in some components. Some examples of widgets may be, by non-limiting example: forms, cookies, banners, embedded video, RSS feeds, SMS functionality, SILVERLIGHT, secure hardware token, file upload, XML parser, and so forth. Widgets may be associated with threats through the database, using an interface similar to interface 600 (but accessible by selecting "widgets" from interface 700), and may be added to any diagram in the same way that components are added, which may include defining communication protocols between the widget and other components/widgets.

In implementations a software installation on one or more computing devices to implement the systems and methods may include storing in the database default libraries, such as over 650 threats, and a number of standard or default definitions for components, default risk levels to choose from, though the user may set up custom threats and associations through the database (which essentially sets up custom risk algorithms), custom risk levels to choose from, and so forth, as described above.

The ability of the user to diagram a system, application or process visually allows for non-security experts to analyze threats using a threat model. In implementations previously generated diagrams may be able to be imported into the system using a PDF or VIZIO drawing.

In implementations the system is configured to interface with third-party software applications and libraries (including software as a service (SAAS)) services, by communicating with the third-party software/library using its application programming interface (API). This may be used, for example, to store standards from standards-issuing bodies in the database and to associate them with security requirements and/or compensating controls through the database. This may assist a user to determine when a component added to a diagrammed threat model would qualify as a compensating control as defined by the standards issuing body.

The system may be said to include a "contextual threat engine," which is the underlying database relations allowing the system to dynamically update the threat model each time a component is mapped onto the canvas, or connected with another component using a communication protocol, or when a protocol is changed or deleted, or a component removed, etc. The systems and methods described herein facilitate comprehensive enterprise-level attack surface analysis. Different users may use different interfaces within an organization in some implementations. Information technology (IT) professionals may define the actors, threats, components, etc. specific to an organization, non-IT professionals may map out systems using the canvas, executives may review the high level threat details included in the home page or threat model, and so forth (though in other organizations any user may use any interface).

In places where the description above refers to specific embodiments of systems and methods of including compensating controls in a threat modeling process, one or more or many modifications may be made without departing from the spirit and scope thereof. Details of any specific embodiment/implementation described herein may, wherever possible, be applied to any other specific implementation/embodiment described herein.

What is claimed is:

1. A threat modeling method, comprising:
   in response to receiving one or more user inputs, using one or more interfaces displayed on one or more displays of one or more computing devices communicatively coupled with one or more databases:
   storing a plurality of threat model components in the one or more databases;
   storing a plurality of threats in the one or more databases;
   associating each threat with at least one of the threat model components through the one or more databases;
   storing a plurality of security requirements in the one or more databases, including storing an indication of whether each security requirement is a compensating control;
   associating each compensating control with at least one of the threats through the one or more databases;
   displaying a relational diagram of one of a system, an application, and a process, using visual representations of one or more of the threat model components, the relational diagram defining a threat model;
   generating and displaying a threat report displaying each threat that is associated through the one or more databases with one of the threat model components included in the threat model; and;
   generating and displaying a report displaying each compensating control that is associated through the one or more databases with one of the threats included in the threat report.

2. The method of claim 1, further comprising, in response to receiving the one or more user inputs, adding one of the threat model components to the relational diagram and automatically including each threat associated with the added threat model component to the threat report.

3. The method of claim 1, further comprising, in response to receiving the one or more user inputs, removing one of the threat model components from the relational diagram and automatically excluding each threat associated with the removed threat model component from the threat report except for threats also associated with other threat model components included in the threat report.

4. The method of claim 1, wherein the threat report displays a threat status for each threat indicating whether that threat has been mitigated.

5. The method of claim 4, wherein the threat report includes one or more input fields configured to, in response to receiving one or more user inputs, manually change each threat status.

6. The method of claim 4, further comprising, in response to receiving the one or more user inputs, removing one of the compensating controls from the relational diagram and automatically changing the threat status of at least one of the threats included in the threat report to an unmitigated status.

7. The method of claim 1, further comprising, in response to receiving a user selection of one of the compensating controls previously included in the relational diagram, displaying a mitigations interface displaying each threat included in the threat report and identifying which of the displayed threats are mitigatable by the selected compensating control.

8. The method of claim 7, further comprising, in response to receiving one or more user inputs using the mitigations interface, altering which of the displayed threats are mitigatable by the selected compensating control.

9. The method of claim 7, further comprising, in response to receiving one or more user inputs using the mitigations interface, changing a threat status, of each threat mitigatable by the selected compensating control, to a mitigated status.

10. A threat modeling system, comprising:
    one or more computing devices communicatively coupled with one or more databases, the one or more computing devices displaying, on one or more displays of the one or more computing devices:
    one or more input interfaces configured to, in response to receiving one or more user inputs, store a plurality of user-defined threat model components in the one or more databases, store a plurality of threats in the one or more databases, associate each of the threats with at least one of the threat model components through the one or more databases, store a plurality of security requirements in the one or more databases including an indication for each security requirement indicating whether it comprises a compensating control, and associate each compensating control with at least one of the threats through the one or more databases;

a diagram interface configured to, in response to receiving one or more user inputs, diagram one of a system, an application, and a process, using visual representations of the threat model components stored in the one or more databases, to define a threat model;

a threat report interface including a threat report displaying each threat that is associated through the one or more databases with one of the threat model components included in the threat model; and;

a compensating control report displaying each compensating control that is associated through the one or more databases with one of the threats included in the threat report.

11. The system of claim 10, wherein the threat report comprises a table displaying, for each displayed threat, a risk level, a threat status indicating whether that threat has been mitigated, and a source.

12. The system of claim 11, wherein the threat report comprises one or more input fields configured to, in response to receiving one or more user inputs, manually change the threat status of a selected threat.

13. The system of claim 10, wherein the compensating control report comprises a table displaying, for each displayed compensating control, a mitigatable threat, a source for the mitigatable threat, a risk level for the mitigatable threat, and a threat status indicating whether the mitigatable threat has been mitigated.

14. The system of claim 10, the one or more displays further displaying a threat tree visually depicting each threat model component included in the threat model, each threat associated with that threat model component depicted branching from that threat model component, and each compensating control associated with that threat depicted branching from that threat.

15. The system of claim 10, wherein the one or more input interfaces are further configured to, in response to receiving the one or more user inputs, associate each threat model component with one or more of the security requirements through the one or more databases.

16. The system of claim 10, wherein the diagram interface is further configured to, in response to receiving the one or more user inputs, diagram a communication protocol between two diagrammed threat model components, the diagrammed communication protocol including an alphanumeric indicator of the communication protocol.

17. The system of claim 10, the one or more displays further displaying a mitigations interface displaying all threats included in the threat report that are associated through the one or more databases with a selected compensating control, the mitigations interface identifying which of the displayed threats are mitigatable by the selected compensating control.

18. The system of claim 17, wherein the mitigations interface comprises one or more input fields configured to, in response to receiving one or more user inputs, alter which of the displayed threats are mitigatable by the selected compensating control.

19. The system of claim 17, wherein the mitigations interface comprises one or more input fields configured to, in response to receiving one or more user inputs, change a threat status, of all threats mitigatable by the selected compensating control, to a mitigated status.

20. A threat modeling system, comprising:
one or more computing devices communicatively coupled with one or more databases, the one or more computing devices displaying, on one or more displays of the one or more computing devices:
one or more input interfaces configured to, in response to receiving one or more user inputs, store a plurality of user-defined threat model components in the one or more databases, store a plurality of threats in the one or more databases, associate each of the threats with at least one of the threat model components through the one or more databases, store a plurality of security requirements in the one or more databases including an indication for each security requirement indicating whether it comprises a compensating control, and associate each compensating control with at least one of the threats through the one or more databases;

a diagram interface configured to, in response to receiving one or more user inputs, diagram one of a system, an application, and a process, using visual representations of the threat model components stored in the one or more databases, to define a threat model;

a threat report interface including a threat report displaying each threat that is associated through the one or more databases with one of the threat model components included in the threat model;

a compensating control report displaying:
each compensating control that is associated through the one or more databases with one of the threats included in the threat report;
the threat included in the threat report that is associated with that compensating control (mitigatable threat), and;
a threat status for each mitigatable threat indicating whether it has been mitigated, and;

a mitigations interface displaying all threats included in the threat report that are associated through the one or more databases with a selected compensating control, the mitigations interface identifying which of the displayed threats are mitigatable by the selected compensating control, the mitigations interface comprising one or more input fields configured to, in response to receiving one or more user inputs, change the threat status of all threats mitigatable by the selected compensating control to a mitigated status.

* * * * *

UNITED STATES PATENT AND TRADEMARK OFFICE
CERTIFICATE OF CORRECTION

| | | |
|---|---|---|
| PATENT NO. | : 10,664,603 B2 | Page 1 of 1 |
| APPLICATION NO. | : 16/270276 | |
| DATED | : May 26, 2020 | |
| INVENTOR(S) | : Anurag Agarwal | |

It is certified that error appears in the above-identified patent and that said Letters Patent is hereby corrected as shown below:

On the Title Page

In item (57), Line 3 of the abstract, change "requirements in a" to -requirements in-.

In the Specification

Column 5, Line 37 change "compensatory" to -compensating-.
Column 13, Line 36 change "similar as described" to -similar to what is described-.
Column 13, Line 49 change "showing" to -shows-.
Column 14, Line 17 change "easier. P For" to -easier. For-.
Column 15, Line 48 change "a cloud computing" to -cloud computing-.
Column 16, Line 43 change "popup threat" to -popup threat report-.
Column 17, Lines 10-11 change "a similar" to -an-.
Column 17, Line 11 change "to the" to -similar to the-.
Column 17, Line 47 change "list" to -lists-.
Column 18, Line 57 change "there is a "WINDOWS 7 " group" to -there is a "WINDOWS 7" group-.
Column 19, Line 10 change "the component" to -component-.
Column 19, Line 16 change "ID a version" to -a CPE ID indicating a version-.
Column 21, Line 7 delete "associated".
Column 21, Line 42 change "5 s mapped" to -5 is mapped-.
Column 22, Line 50 change "functionality" to -the web page having functionality-.
Column 23, Line 6 "650" should be unbolded.

Signed and Sealed this
Fourteenth Day of July, 2020

Andrei Iancu
*Director of the United States Patent and Trademark Office*